United States Patent
Kurachi (12)

(10) Patent No.: US 6,181,436 B1
(45) Date of Patent: Jan. 30, 2001

(54) PRINT MANAGING SYSTEM AND PRINT MANAGING METHOD

(75) Inventor: Atsuhiko Kurachi, Nagoya (JP)

(73) Assignee: Brother Kogyo Kabushiki Kaisha, Nagoya (JP)

( * ) Notice: Under 35 U.S.C. 154(b), the term of this patent shall be extended for 0 days.

(21) Appl. No.: 09/064,760

(22) Filed: Apr. 23, 1998

(30) Foreign Application Priority Data

Apr. 28, 1997 (JP) .................................................. 9-111451
Apr. 30, 1997 (JP) .................................................. 9-113006

(51) Int. Cl.$^7$ ............................. G06K 15/02; G06F 3/00
(52) U.S. Cl. ........................... 358/1.15; 358/1.2; 358/1.6; 358/1.16
(58) Field of Search ...................... 358/1.15, 1.16, 358/1.14, 1.13, 1.9, 1.6, 1.2

(56) References Cited

U.S. PATENT DOCUMENTS

| 5,438,436 | * | 8/1995 | Harris ................................ 358/500 |
| 5,559,933 | * | 9/1996 | Boswell ............................ 358/1.15 |
| 5,764,235 | * | 6/1998 | Hunt et al. ........................ 345/428 |
| 5,768,483 | * | 6/1998 | Maniwa et al. ................... 358/1.15 |
| 5,812,991 | * | 9/1998 | Kara .................................. 705/410 |
| 5,903,309 | * | 5/1999 | Anderson ......................... 348/333 |

FOREIGN PATENT DOCUMENTS

| 62-291263 | 12/1987 | (JP) | .............................. H04N/1/387 |
| 6-110626 | 4/1994 | (JP) | .............................. G06F/3/12 |
| 7-40608 | 2/1995 | (JP) | .............................. G06F/3/12 |

* cited by examiner

Primary Examiner—David K. Moore
Assistant Examiner—King Y. Poon
(74) Attorney, Agent, or Firm—Oliff & Berridge, PLC

(57) ABSTRACT

A print managing system has: client apparatuses for generating print data and sending the generated print data to a printing apparatus; and the printing apparatus connected with each of the client apparatuses though a network for receiving the print data from each of the client apparatuses, managing the received print data as a print job, which is an unit corresponding to one print data received from each of the client apparatuses, and printing the received print data for each print job. Each of the client apparatuses generates the print data and sends the print data to the printing apparatus. The printing apparatus receives the print data and manages the print data as the print job. Further, the printing apparatus produces the rough image on the basis of the print data. When receiving the request signal sent from each client apparatus, the printing apparatus sends the print job information to each client apparatus. The print job information includes the management information of the print job managed by the printing apparatus and the rough image correlated with the print data corresponding to the print job. When receiving the print job information from the printing apparatus, each client apparatus displays the management information and the rough image included in the received print job information.

21 Claims, 12 Drawing Sheets

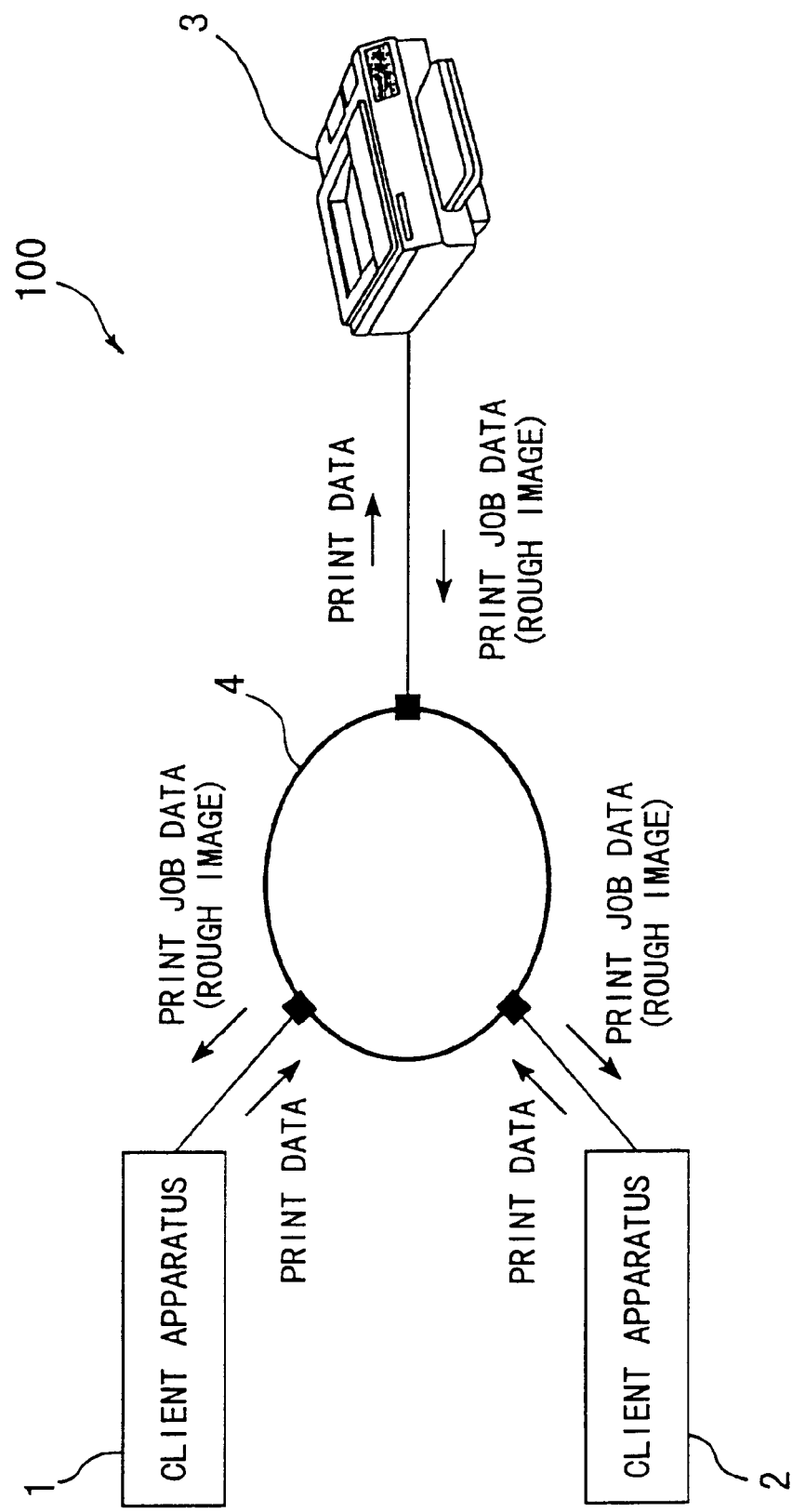

PRINT MANAGING SYSTEM AND PRINT MANAGING METHOD

BACKGROUND OF THE INVENTION

1. Field of the Invention

The present invention relates to a print managing system and a print managing method for managing print data sent from client apparatuses to a printing apparatus through a network.

2. Description of the Related Art

Up to now, a printing system, in which print data is sent from a plurality of client apparatuses through a network, the print data is received and processed by a printing apparatus or a print server apparatus adaptable to the network and the received and processed print data is printed out by the printing apparatus, is put to practical use.

In such a printing system, a print spool function is disposed on a Printing apparatus or a print server apparatus, in many cases. The print spool function is a function of sorting the print data from each client apparatus into a management unit referred to as a print job, and then managing the allowance or rejection of the output of each print job, a print order and the like, and sequentially outputting each print job to a print output section in order to print out.

Further, information of the print jobs managed by the print spool function are displayed as a list by each client apparatus, the printing apparatus or the print sever apparatus, and a user can order to change the printing order, cancel or stop the printing operation, etc. by viewing the displayed list of the information of the print jobs.

Namely, identification information of the client apparatus by which the print data corresponding to each print job is outputted, identification information called a print job name and information of a data capacity to be printed out, a reception time of a print job or the like are displayed as the information of each print job. The user can select the desired print job by viewing these information, and give his or her orders to the client apparatus.

However, there may be a case that only a vague name is given to a print job name in the conventional printing system, depending on an application software by which the print data is outputted and the like. Moreover, there may be a case that the client apparatus corresponding to each print job cannot be identified depending on a used communication protocol.

Thus, there may be a case that it is difficult to determine which jobs correspond to what kind of print data.

Then, a method which can display a content of the print data as an image in a client apparatus, a network printing apparatus before printing is proposed and disclosed in Japanese Patent Application Laid Open (KOKAI) No. 62-291263, Japanese Patent Application Laid Open (KOKAI) No. 6-110626, Japanese Patent Application Laid Open (KOKAI) No. 7-40608 or the like.

According to such a method, it is possible to confirm a content of the print data. However, in such a method, it is difficult to confirm the plural print jobs simultaneously, so that the user cannot easily select a desired print job from the plural print jobs managed by the print spool function. In order to enable easy selection of the desired print job from the plural print jobs managed by the print spoor function, a list of the print jobs is required.

Further, if the image is indiscriminately displayed, there may be the risk of other people viewing the print data that is not desired to be viewed. This results in a problem of a security.

SUMMARY OF THE INVENTION

It is therefore a first object of the present invention to provide a print managing system and a print managing method which can distinguishably display a content of each print job in order to make selection of the print job easy.

Further, it is a second object of the present invention to provide a print managing system and a print managing method which can keep print data secret.

According to the present invention, the aforementioned first object can be achieved by a print managing system having: a plurality of client apparatuses for generating print data and sending the generated print data to a printing apparatus; and the printing apparatus connected with each of the client apparatuses though a network for receiving the print data from each of the client apparatuses, managing the received print data as a print job, which is an unit corresponding to one print data received from each of the client apparatuses, and printing the received print data for each print job, each of the client apparatuses having: a print data generating device for generating the print data; a print data sending device for sending the generated print data to the printing apparatus; a print job information request device for sending a request signal to request print job information to the printing apparatus; a print job information receiving device for receiving the print job information from the printing apparatus; and a print job information display device for displaying the received print job information as a list, in which management information of the print job and a rough image correlated with the print data corresponding to the Print job included in the received print job information are arranged, the printing apparatus having: a print data receiving device for receiving the print data from each of the client apparatuses; a print data storing device for storing the received print data; a rough image producing device for producing a rough image, which roughly shows an image corresponding to the stored print data, on the basis of the stored print data; a rough image storing device for storing the produced rough image, and correlating the produced rough image with the stored print data on which the produced rough image is based; a print job managing device for managing the stored print data as the print job; a request receiving device for receiving the request signal from each of the client apparatuses; and a print job information sending device for sending the print job information including the management information to identify the print job managed by the print job managing device and the rough image correlated with the print data corresponding to the print job to each of the client apparatuses in response to a reception of the request signal.

Namely, in each of the client apparatuses, the print data generating device generates the print data, and the print data sending device sends the generated print data to the printing apparatus. Then, in the printing apparatus, the print data receiving device received the print data from each of the client apparatuses, and the print data storing device stores the received print data. Then, in the printing apparatus, the rough image producing device produces the rough image on the basis of the stored print data. The rough image is rough image showing the image corresponding to the stored print data. For instance, the rough image is produced by reducing the size of the image corresponding to the print data or by simplify the image corresponding to the print data. Further, in the printing apparatus, the rough image storing device stores the rough image. At this time, the rough image storing device correlates the rough image with the print image on which the rough image is based when the rough image is produced. Furthermore, in the printing apparatus, the print job managing device manages the stored print data as the print job. The print job is unit corresponding to one print data sent from each of the client apparatuses.

Next, in each of the client apparatuses, the print job information request device sends the request signal to the printing apparatus. The request signal is a signal to request the printing apparatus to send the print job information. Then, in the printing apparatus, the request receiving device receives the request signal from each of the client apparatuses. In response to the request signal, the print job information sending device sends the print job information. The print job information includes the management information of the print job managed by the print job managing device and the rough image correlated with the print data corresponding to the print job.

Further, in each of the client apparatuses, the print job information receiving device the print job information from the printing apparatus, the print job information display device displays the received print job information as the list. Namely, the management information of the print job and the rough image correlated with the print data corresponding to the print job are arranged in the list.

Thus, when a user views the list, the user can easily identify the print job by the rough image. In a case that a plurality of the print data are sent from each of the client apparatuses to the printing apparatus sequentially or simultaneously, the print job managing device manages the plurality of print jobs. In this case, the print job information includes the management information of the plurality of the print jobs and the plurality of the rough images corresponding to the print jobs. Thus, in each of the client apparatuses, the list in which the management information of the plurality of the print jobs and the plurality of the rough images corresponding to the print jobs is displayed. When the user views this list, the user can easily identify the print jobs by the rough images, and select the print jobs easily and correctly.

On the other hand, in a case that the print data in the printing apparatus includes data corresponding to a plurality of pages, the rough image producing device may produce a plurality of the rough images each corresponding to respective one of the plurality of pages. In this case, the print job information request device sends page information to select one or more pages from the plurality of the pages to the printing apparatus, together with the request signal. Then, in the printing apparatus, the request receiving device may receive the page information from each of the client apparatuses, together with the request signal, and the print job information sending device may send the print job information including the management information and the rough images of only pages selected on the basis of the received page information. Thus, in each of the client apparatuses, the rough images of only the selected pages are displayed. Accordingly, even if there is common print data in a plurality of print jobs, it is possible to surely identify each print job.

Moreover, in the printing apparatus, the rough image producing device may change a shape of a line forming a contour of the produced rough image according to a size of printing paper to be used for printing the stored print data. Further, the rough image producing device may change a size of the produced rough image according to a size of printing paper to be used for printing the stored print data. Accordingly, since only the necessary minimum rough images are sent to the client apparatus, it is possible to quickly display the print job information.

According to the present invention, the aforementioned second object can be achieved by a printing managing system having: a plurality of client apparatuses for generating print data and sending the generated print data to a printing apparatus; and the printing apparatus connected with each of the client apparatuses though a network for receiving the print data from each of the client apparatuses, managing the received print data as a print job, which is an unit corresponding to one print data received from each of the client apparatuses, and printing the received print data for each print job, each of the client apparatuses having: a print data generating device for generating the print data; a print data encryption device for encrypting the generated print data; a print data sending device for sending the encrypted print data to the printing apparatus; a print job information request device for sending a request signal to request print job information to the printing apparatus; a print job information receiving device for receiving an encrypted print job information from the printing apparatus; a print job information decryption device for decrypting the received print job information; and a print job information display device for displaying the decrypted print job information as a list, in which management information of the print job and a rough image correlated with the print data corresponding to the print job included in the decrypted print job information are arranged, the printing apparatus having: a print data receiving device for receiving the encrypted print data from each of the client apparatuses; a print data decryption device for decrypting the received print data; a print data storing device for storing the decrypted print data; a rough image producing device for producing a rough image, which roughly shows an image corresponding to the stored print data, on the basis of the stored print data; a rough image storing device for storing the produced rough image, and correlating the produced rough image with the stored print data on which the produced rough image is based; a print job managing device for managing the stored print data as the print job; a request receiving device for receiving the request signal from each of the client apparatuses; a print job information encryption device for encrypting the print job information including the management information to identify the print job managed by the print job managing device and the rough image correlated with the print data corresponding to the print job; and a print job information sending device for sending the encrypted print job information to each of the client apparatuses in response to a reception of the request signal.

Namely, in each client apparatus, before sending the print data, the print data encryption device encrypts the print data, and encrypted print data is sent to the printing apparatus. Then, in the printing apparatus, the print data decryption device decrypts the receiving print data, and the decrypted print data is stored. Further, in the printing apparatus, before sending the print job information, the print job information encryption device encrypts the print job information, i.e., the management information of the print job and the rough image, and the encrypted print job information is sent to each client apparatus. On the other hand, in each client apparatus, the print job information decryption device decrypts the received print job information, and the decrypted print job information is displayed as the list of print job.

Here, when one of the client apparatus sends the encrypted print data, the only one of the client apparatuses can decrypt the encrypted print job information with respect to this print data, and display the decrypted print job information. Namely, other client apparatuses cannot decrypt this encrypted print job information, and cannot display this print job information. Accordingly, it is possible to keep the contents of this print data secret.

According to the present invention, the aforementioned second object can be also achieved by a print managing apparatus wherein when secret setting information to instruct to make a secret of the print data is sent from one of the client apparatuses to the printing apparatus, the print job information sending device of the printing apparatus does not send the print job information to other client apparatus.

According to the present invention, the aforementioned first object can be also achieved by a method of managing the print job in a print managing system having: a plurality of client apparatuses for generating print data and sending the generated print data to a printing apparatus; and the printing apparatus connected with each of the client apparatuses though a network for receiving the print data from each of the client apparatuses, managing the received print data as a print job, which is unit corresponding to one print data received from each of the client apparatuses, and printing the received print data for each print job, the method having the processes of: generating the print data in each of the client apparatuses; sending the generated print data from each of the client apparatuses to the printing apparatus; receiving the print data from each of the client apparatuses in the printing apparatus; storing the received print data in the printing apparatus; producing a rough image, which roughly shows an image corresponding to the stored print data, on the basis of the stored print data in the printing apparatus; storing the produced rough image, and correlating the produced rough image with the stored print data, on which the produced rough image is based, in the printing apparatus; managing the stored print data as the print job in the printing apparatus; sending a request signal to request print job information from each of the client apparatuses to the printing apparatus; receiving the request signal from each of the client apparatuses, in the printing apparatus; sending the print job information including management information to identify the print job managed in the print job managing process and the rough image correlated with the print data corresponding to the print job from the printing apparatus to each of the client apparatuses, in response to a reception of the request signal; receiving the print job information from the printing apparatus, in each of the client apparatuses; and displaying the received print job information as a list, in which the management information of the print job and the rough image correlated with the print data corresponding to the print job included in the received print job information are arranged. Thus, when a user views the list, the user can easily identify the print job by the rough image.

According to the present invention, the aforementioned second object can be also achieved by a method of managing the print job in a print managing system having: a plurality of client apparatuses for generating print data and sending the generated print data to a printing apparatus; and the printing apparatus connected with each of the client apparatuses though a network for receiving the print data from each of the client apparatuses, managing the received print data as a print job, which is unit corresponding to one print data received from each of the client apparatuses, and printing the received print data for each print job, the method having the processes of: generating the print data in each of the client apparatuses; encrypting the generated print data in each of the client apparatuses; sending the encrypted print data from each of the client apparatuses to the printing apparatus; receiving the encrypted print data from each of the client apparatuses in the printing apparatus; decrypting the received print data in the printing apparatus; storing the decrypted print data in the printing apparatus; producing a rough image, which roughly shows an image corresponding to the stored print data, on the basis of the stored print data in the printing apparatus; storing the produced rough image, and correlating the produced rough image with the stored print data, on which the produced rough image is based, in the printing apparatus; managing the stored print data as the print job in the printing apparatus; sending a request signal to request print job information to the printing apparatus, in each of the client apparatuses; receiving the request signal from each of the client apparatuses, in the printing apparatus; encrypting the print job information including management information to identify the print job managed in the print job managing process and the stored rough image correlated with the print data corresponding to the print job, in the printing apparatus; sending the encrypted print job information from the printing apparatus to each of the client apparatuses in response to the received request signal; receiving an encrypted print job information from the printing apparatus, in each of the client apparatuses; decrypting the received print job information in each of the client apparatuses; and displaying the decrypted print job information as a list, in which the management information of the print job and the rough image correlated with the print data corresponding to the print job included in the decrypted print job information are arranged, in each of the client apparatuses. Accordingly, it is possible to keep the contents of this print data secret.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 1 is a diagram showing a print managing system of a first embodiment of the present invention;

DETAILED DESCRIPTION OF THE PREFERRED EMBODIMENTS

I. First Embodiment

Figure 2A:
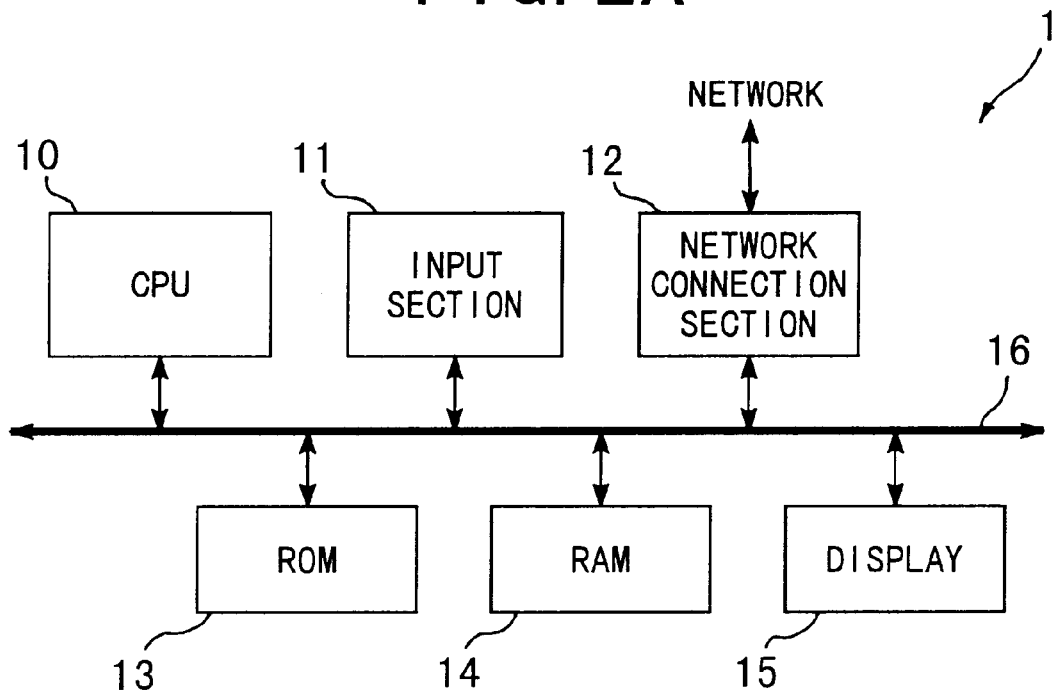
FIG. 2A is a block diagram showing a configuration of a computer of the first embodiment of the present invention.

As shown in FIG. 1, a print managing system 100 of this embodiment is provided with: client apparatuses 1, 2, such as a personal computer and the like, for generating print data; a network printer 3 which is a printing apparatus adaptable to a network; and a network 4 for connecting them.

In this print managing system, the print data outputted by the client apparatus 1 or 2 is sent to the network printer 3 through the network 4, and managed by the network printer 3 at a unit referred to as a print job. Then, if the client apparatus 1 or 2 requires the network printer 3 to send the information of the print job, rough image data together with print job management information is sent by the printer 3 to the client apparatus 1 or 2 through the network 4.

Each of the client apparatuses 1 and 2 has a configuration as shown in FIG. 2A in order to generate such print data and send and receive various data. Incidentally, the configuration of the client apparatus 1 is the same as that of the client apparatus 2. Hence, the explanation of the client apparatus 2 is omitted.

As shown in FIG. 2A, the client apparatus 1 is provided with a CPU 10, an input section 11 for inputting the data necessary for the process in the client apparatus 1, a network connection section 12, a ROM 13, a RAM 14, a display 15 and a bus 16 for connecting these respective components.

The network connection section 12 performs the conversion of a protocol for the data outputted by the client apparatus I and the data inputted to the client apparatus 1 and the like to thereby enable the client apparatus 1 to send and receive the data through the network 4.

The input section 11 composed of a keyboard, a mouse and the like outputs the data inputted by an operation of a user of the client apparatus 1 through the bus 16 to the CPU 10 and the like.

The ROM 13 is a read only memory for storing a control program necessary for the process in the CPU 10, and then reads out the necessary program at a predetermined timing to output to the bus 16.

The RAM 14 is actually composed of a memory, such as a hard disk and the like, and a print management control program to realize functions described later is installed therein. Moreover, it temporarily stores the data necessary for the process in the CPU 10 and the like, and outputs to the bus 16 as necessary.

The display 15 performs the display necessary for the process in the CPU 10, and also displays the image corresponding to the display data described later.

The CPU 10 performs an operating process to realize the functions described later, based on a printer driver program and an application program stored in the RAM 14 or controls the above mentioned respective components to thereby cause the client apparatus 1 to function as each device described later.

Figure 2B:
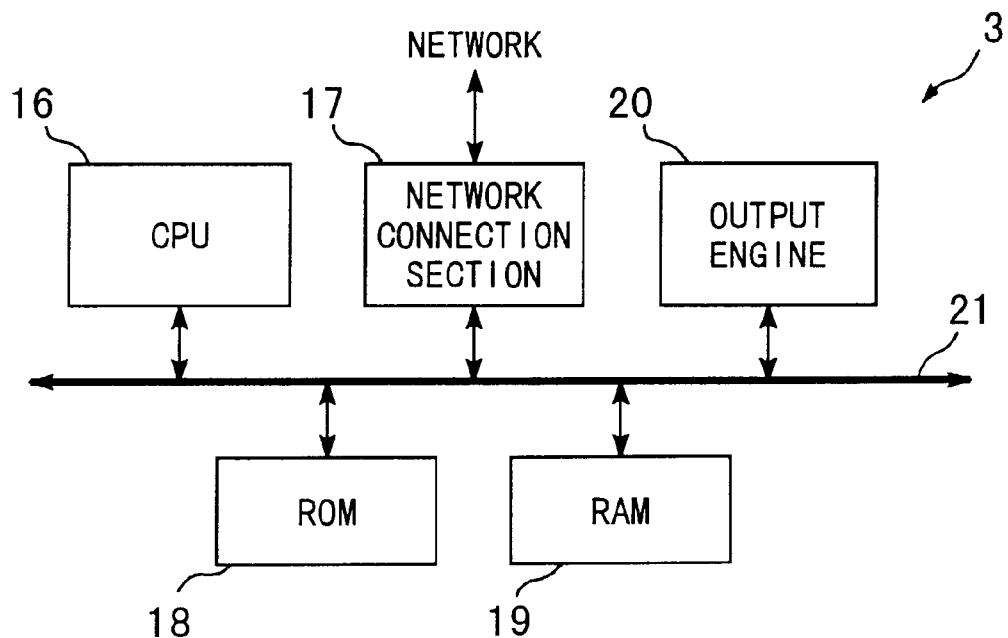
FIG. 2B is a block diagram showing a configuration of a network printer of the first embodiment of the present invention.

Next, the configuration of the printer 3 is explained with reference to FIG. 2B. As shown in FIG. 2B, the printer 3 is composed of a CPU 16, a network connection section 17, a ROM 18, a RAM 19, an output engine 20 and a bus 21.

The network connection section 17 performs the conversion of a protocol for the data outputted by the printer 3 and the data inputted to the printer 3 and the like to thereby enable data communication between the client apparatuses 1 and 2 and the printer 3 through the network.

The ROM 18 is a memory for storing a control program to realize functions described later, and then reads out the necessary program at a predetermined timing to output to the bus 21.

The RAM 19 temporarily stores the data necessary for the process in the CPU 16 and the like, and outputs to the bus 21 as necessary.

The output engine 20 is composed of an ink jet type or a laser beam type of a printing section, and performs a printing process by the control of the CPU 16.

The CPU 16 performs an operating process to realize the functions described later, based on the control program stored in the ROM 18, or controls the above mentioned respective devices to thereby cause the network printer 3 to function as each device described later.

As mentioned above, both the client apparatuses 1, 2 and the printer 3 have CPUs, and are constructed so as to function as the device for implementing the print managing system in this embodiment, based on the installed or pre-stored program.

Figure 3:
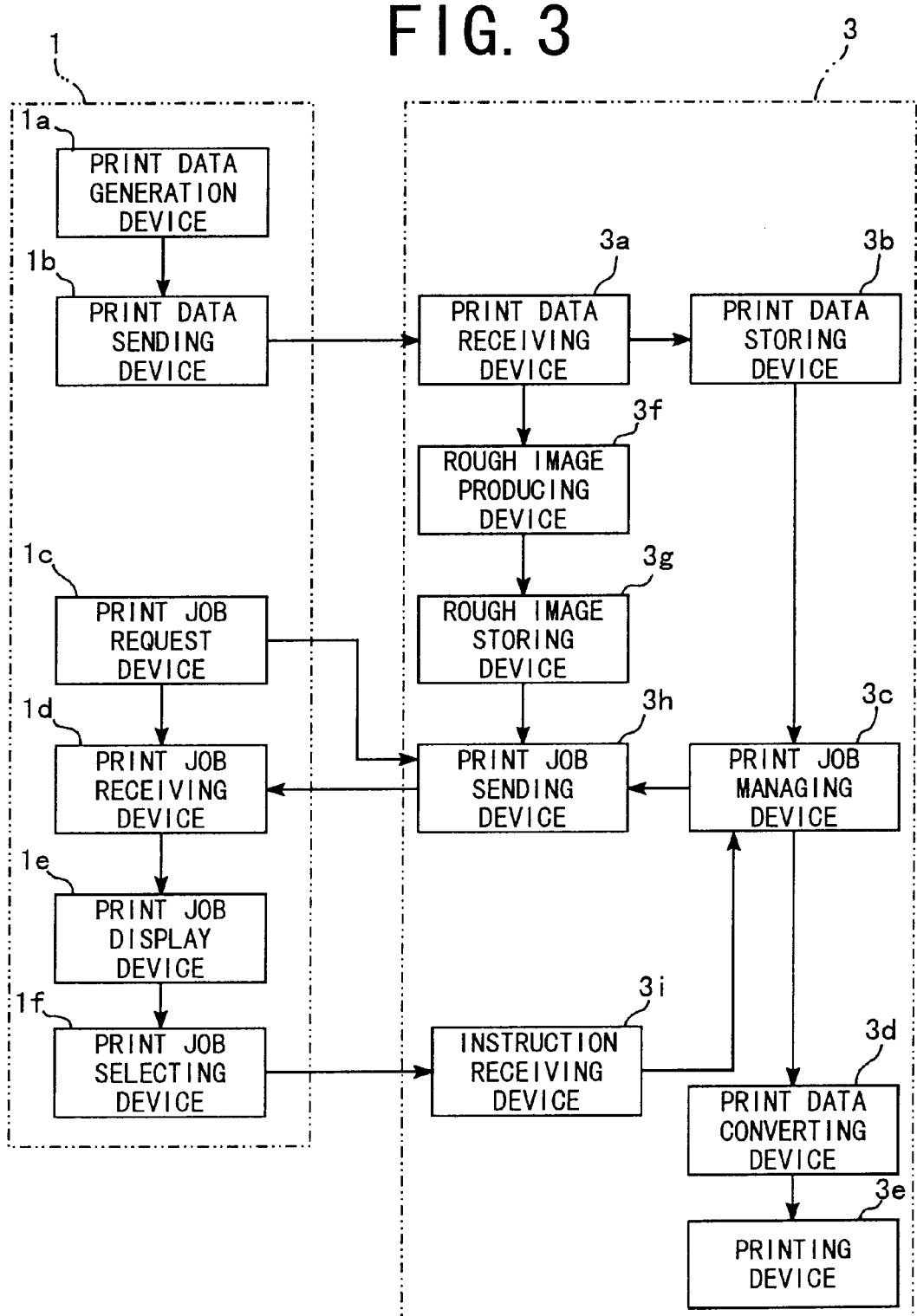
FIG. 3 is a block diagram showing a configuration of the print managing system of the first embodiment of the present invention in view of its functions.

FIG. 3 is a block diagram to explain the client apparatus 1 and the printer 3 in view of the function. Incidentally, also in FIG. 3, the configuration of the client apparatus 2 is similar to that of the client apparatus 1. Thus, the explanation is omitted.

As shown in FIG. 3, the client apparatus 1 functions as a print data generation device 1a, a print data sending device 1b, a print job request device 1c, a print job receiving device 1d, a print job display device 1e and a print job selecting device 1f. Namely, these devices are realized in the CPU 10 by the execution of the installed application program and printer driver program and by cooperation between the CPU 10 and other components of the client apparatus 1, i.e., the input section 11, the network connecting section 12, the ROM 13, the RAM 14, the display 15 and the bus 16.

The print data generating device 1a is a device for generation print data on the basis of image data generated on an application program by a user of the client apparatus 1. The print data is described by using codes or a language which the printing 3 can recognize, such as a page description language.

The print data sending device 1b is a device for sending the print data generated by the print data generating device 1a, through the network 4 to the network printer 3.

The print job request device 1c is a device for, when the user selects a print job request by using a mouse and the like, sending a signal of the request through the network 4 to the network printer 3.

The print job receiving device 1d is a device for receiving the print job data sent through the network 4 and then outputting it to the print job display device 1e described later. This print job data is detailed later.

The print job display device 1e is a device for displaying on the display 15 the print job data sent by the print job receiving device 1d.

The print job selecting device 1f is a device for instructing the process of the print job data displayed on the display 15. Namely, the print job selection device 1f displays pictures of buttons, such as switch boxes, to select the print job and input the instructions. A user can select the desired print job and input the instruction by pushing the pictures of buttons by the mouse. In response to the user's input, the print job selection device 1f selects the print job and sends the operation instruction information, such as an instruction to delete the print job, an instruction to stop or cancel the printing operation and the like, to the network printer 3 with respect to the selected print job.

The network printer 3 functions as a print data receiving device 3a, a print data storing device 3b, a print job managing device 3c, a print data converting device 3d, a printing device 3e, a rough image producing device 3f, a rough image storing device 3g, a print job sending device 3h and an instruction receiving device 3i. Namely, these devices are realized in the CPU 16 by the execution of the control program stored in the ROM 18 and by cooperation between the CPU 16 and other components of the network printer 3, i.e., the network connecting section 17, the ROM 18, the RAM 19, the output engine 20 and the bus 21.

The print data receiving device 3a is a device for receiving the print data sent through the network 4 from the client apparatus 1 or 2 and then outputting the received print data to the print data storing device 3b and the rough image producing device 3f.

The print data storing device 3b is a device for storing the print data outputted by the print data receiving device 3a, and can store the print data with respect to a plurality of print jobs.

The print job managing device 3c is a device for managing the print data stored in the print job storing device 3c for each print job. Further, the print job managing device 3c manages an order of executing the print job, the execution situation and the like by using the print job management information, such as a print job name, a data size, an owner name, a total page, a reception time when the print job is received and the like, which are sent in conjunction with each print data.

The print data converting device 3d is a device for converting the print data, which is managed and outputted by the print job managing device 3c, into picture data, such as bitmap data and the like, and storing the picture data into a page memory or the like.

The printing device 3e is a device for executing the printing operation, based on the picture data generated by the print data converting device 3d.

By the above mentioned functions, the print data sent from the client apparatus 1 or 2 is sequentially printed for each print job. Moreover, as for a request of sending the print job management information from the client apparatus 1 or 2, the transmission of the execution situation in each print job in accordance with the request or the like is performed.

Further, in the print managing system 100 of the first embodiment of the present invention, the information sent from the network printer 3 to each client apparatus 1, 2 is not only the print job management information but also the rough image produced on the basis of the print data of each print job. Accordingly, the user of the client apparatus can easily and surely grasp the content of the print job from the print job name, etc. and the rough image.

The rough image data is produced by, for example, reducing the picture data of the bitmap data to a predetermined size, and is produced by the rough image producing device 3f, in this embodiment.

The rough image producing device 3f is a device for converting into and reducing to the bitmap data based on the print data outputted by the print data receiving device 3a. As for the print data over a plurality of pages. The rough image producing device 3f produces the rough image data about all the pages.

The produced rough image data is stored in the rough image storing device 3g. The rough image storing device 3g stores the rough image data produced by the rough image producing device 3f while correlating to the based print data, and further outputs the rough image data corresponding to each print data, to the print job sending device 3h, in accordance with the request from the print job sending device 3h.

The print job sending device 3h, in accordance with the request sent by the print job request device 1c of the client apparatuses 1 or 2, receives the print job management information from the print job managing device 3c, and receives the rough image data from the rough image storing device 3g, and then outputs to the print job receiving device 1d of each client apparatus 1, 2, as the print job data.

The print managing system in this embodiment has the functions as mentioned above. Thus, the rough image data produced in accordance with the print data of each print job is displayed on the print job display device 1e, together with the print job management information, such as the print job name, the print reception time and the like. Hence, the user of the client apparatus can easily identify and select the content of each print job.

As mentioned above, the operation instruction items are also displayed by the print job selecting device 1f, together with the print job data. Then, when the user selects any one of the items, the operation instruction is sent by the print job selecting device 1f, and received by the instruction receiving device 3i in the printer 3.

The instruction receiving device 3i analyzes and recognizes the content of the received instruction and then sends the received instruction to the print job managing device 3c. Accordingly, the processes, such as the deletion of the print job, a priority execution and the like are performed.

Figure 4:
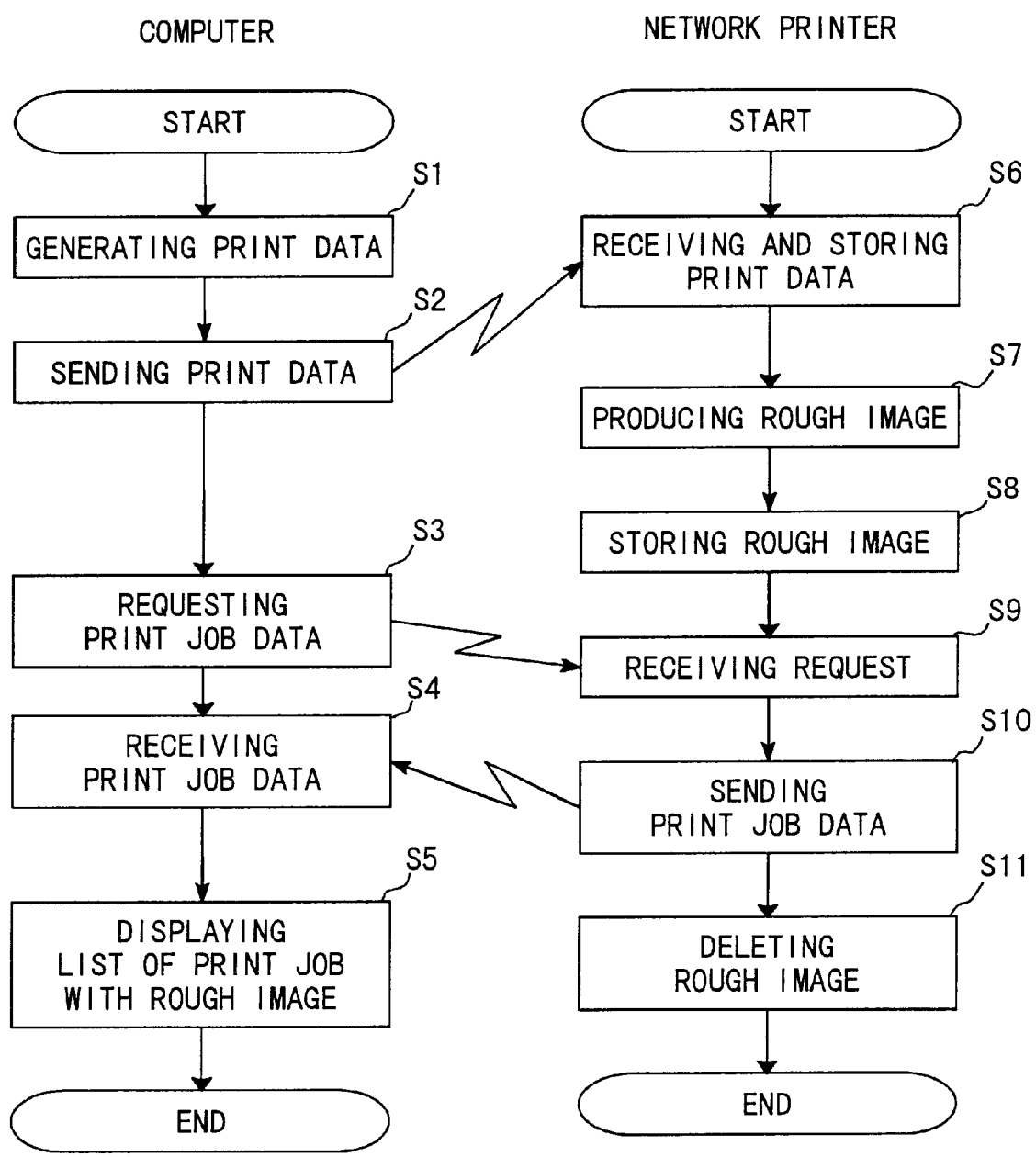
FIG. 4 is a flowchart showing a print managing process in the first embodiment of the present invention.

Next, the operations of the print managing system in this embodiment are explained with reference to FIG. 4.

At first, when a print command is inputted in the client apparatus 1 or 2, print data in a form of the page description language is generated by the print data generation device 1a (Step S1). Next, the print data is sent to the printer 3 by the print data sending device 1b (Step S2), and received by the print data receiving device 3a of the printer 3 (Step S6). Further, the received print data is stored in a spool area by the print data storing device 3b. Then, rough image data based on the received print data is produced by the rough image producing device 3f (Step S7). The rough image data is stored by the rough image storing device 3g while correlated to the based print data (Step S8). Then, the print data is managed by the print job managing device 3c for each print job, and sequentially printed.

On the other hand, when a request command for print job information is inputted in the client apparatus 1 or 2, the print job request device 1c requires the printer 3 to send the print job data (Step S3). When this requirement is received by the print job sending device 3h (Step S9), the print job sending device 3h receives the print job management information with respect to the print data stored in the spool area from the print job managing device 3c, and further receives the stored rough image data, which is correlated to each print data, from the rough image storing device 3g. Then, the print job sending device 3h sends the print job management information and the rough image data to the client apparatus 1 or 2 as the print job data (Step S10).

Figure 5:
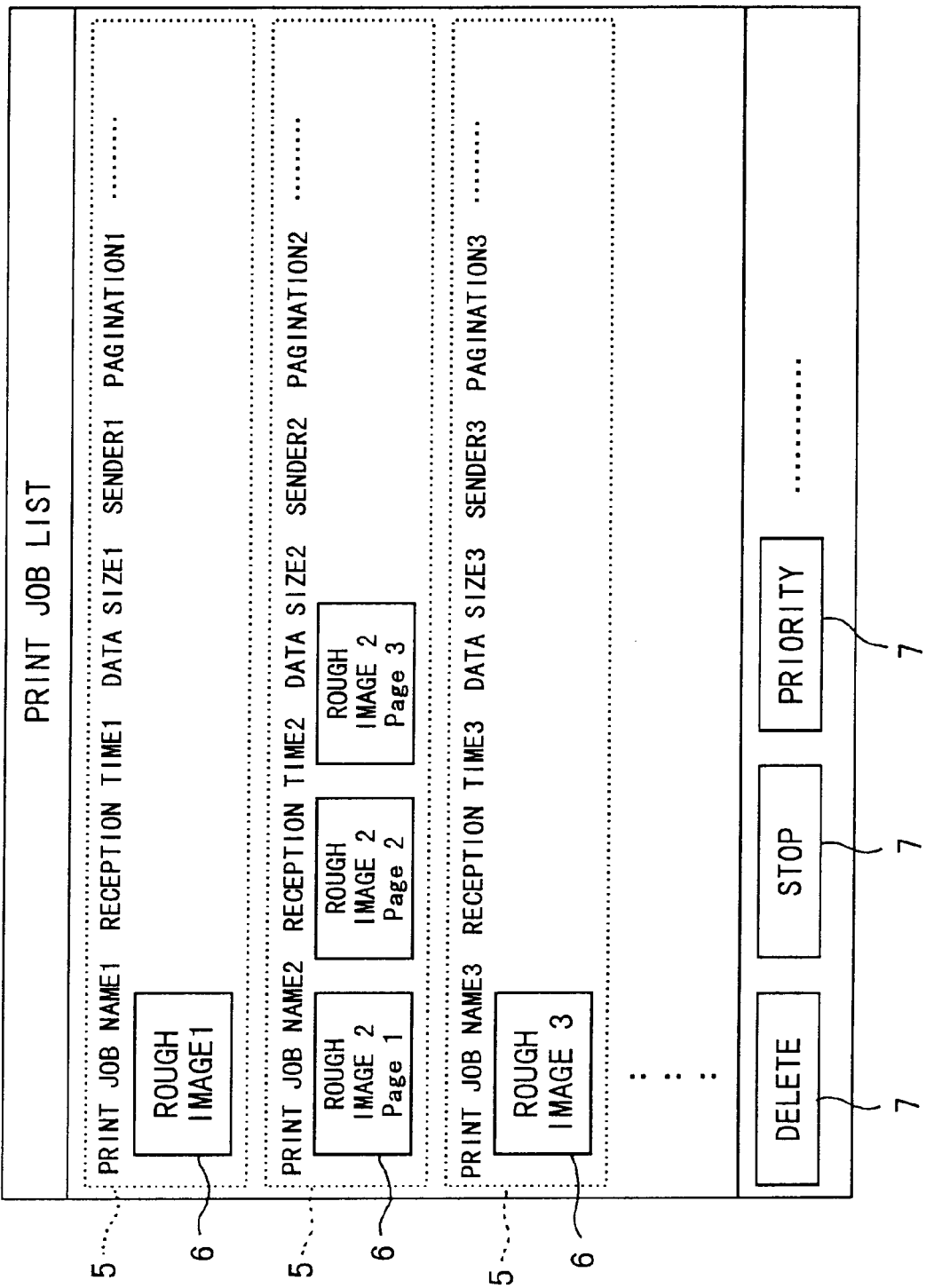
FIG. 5 is diagram showing a list of print jobs displayed on a display of the computer of the first embodiment of the present invention.

This print job data is received by the print job receiving device 1d of the client apparatus 1 or 2 (Step S4), and is displayed by the print job display device 1e, for example, on the display 15 as shown FIG. 5 (Step S5).

As shown in FIG. 5, a list of the print jobs is displayed on the display 15. The list is divided into display blocks 5 corresponding to the respective print jobs. A display area 6 for the rough image and display areas for a print job name, a print reception time, a data size, an owner, a total page and the like are disposed on each display block 5. Each rough image is displayed on the display area 6. Thus, a user can easily identify and select the print job from such a list.

On the other hand, the printing process is consecutively performed parallel to the process of sending the print job data in the printer 3. The rough image data corresponding to the print data of the print job whose printing operation is finished is deleted by the print job managing device 3c (Step S1).

In this embodiment, when the print data exists over a plurality of pages, the rough image data is produced for all the pages. All the rough images can be displayed on the display 15, as shown in FIG. 5

Accordingly, even if there is common print data in a plurality of print jobs, it is possible to surely identify each print job.

Moreover, this embodiment is constructed such that the rough image can be displayed only for the specified page among the plurality of pages. Namely, the specified information of the rough image is sent from the client apparatus 1 or 2 to the printer 3, together with the print job data request information. The printer 3 sends the rough image of the specified page to the client apparatus 1 or 2.

As mentioned above, when the small number of the displayed pages is specified, only the necessary minimum rough image is sent to the client apparatus. Thus, it is possible to quickly display the print job information.

Moreover, as shown in FIG. 5, this embodiment is constructed so as to display buttons 7, such as a deletion, a tentative stop, a priority or the like, as the print job selecting device 1f. Hence, after a user clicks a display block 5 in any print job shown by dashed lines in FIG. 5 to thereby specify a print job, he can click any one of the buttons 7 to thereby specify the process of the print job.

As mentioned above, according to this embodiment, the rough image of the print data is produced for each print job in the printer 3, sent to the client apparatus 1 or 2, and then, displayed in the list of the print jobs in the client apparatus 1 or 2. Thus, it is possible to easily identify the content of each print job. For example, this reduces the possibility of an erroneous operation, such as an accidental deletion of the necessary print job and the like.

The print job can be identified and selected by the rough image. Hence, even in a case of a print job to which a print job name is not automatically given, the print job can be identified and selected by the rough image. Therefore, it is not necessary to input a print job name in the client apparatus or to perform other operations.

Figure 6:
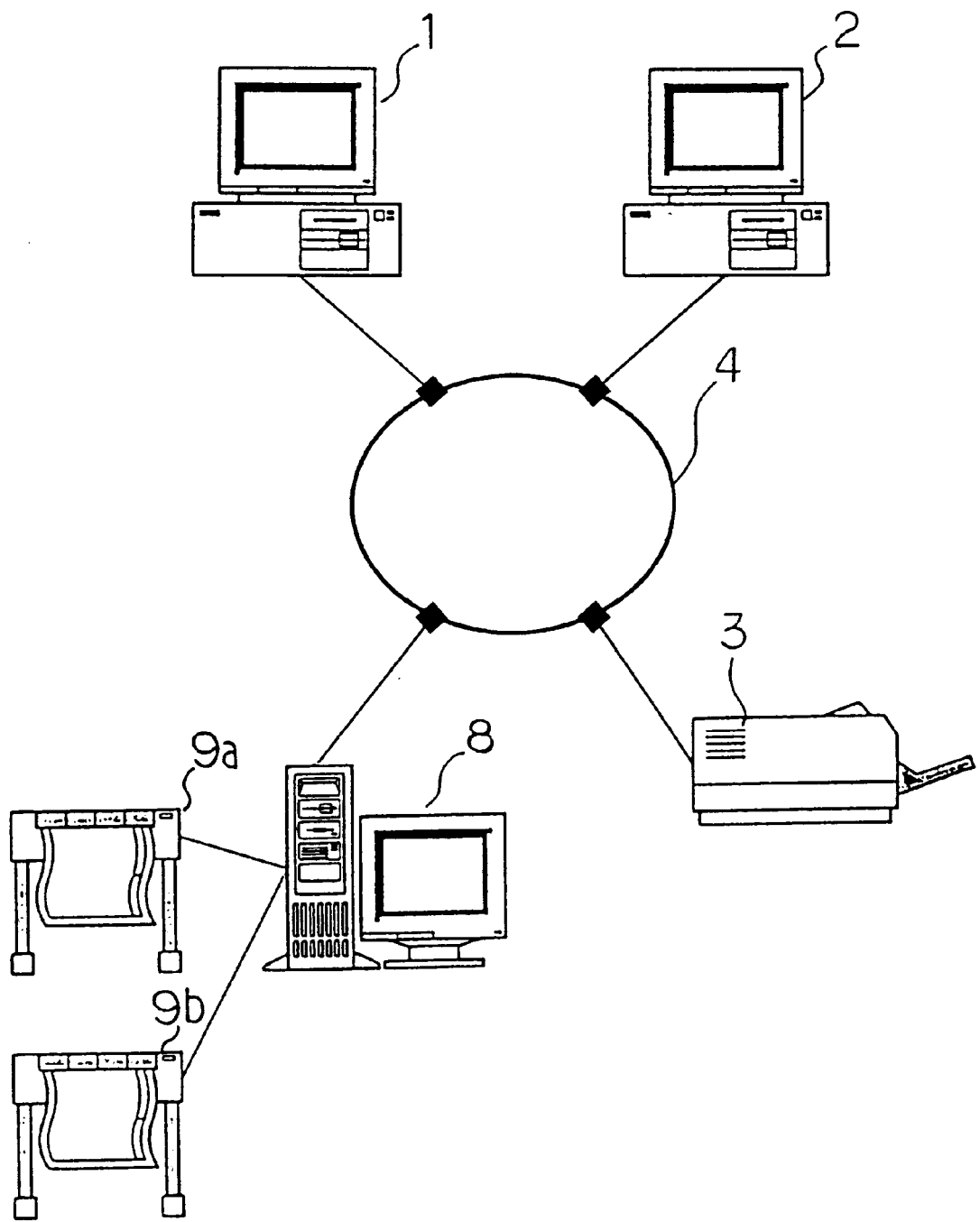
FIG. 6 is a diagram showing another configuration of the print managing system of the first embodiment of the present invention.

Next, a variation example of this embodiment is explained with reference to FIG. 6. The above mentioned embodiment is constructed so as to receive and store the print data, manage the print job, convert into the picture data and produce the rough image data on the network printer 3. However, the present invention is not limited thereto. As shown in FIG. 6, it may be constructed such that a print server apparatus 8 connected to a network 4 has the above mentioned respective functions and an actually printing operation is performed by printers 9a, 9b connected to the print server apparatus 8.

It is naturally possible to connect the print server apparatus 8 and the network printer 3 in the above mentioned embodiment on the same network 4 to use.

Moreover, the print job data may be displayed on a display of the print server apparatus 8 as well as the client apparatuses 1, 2. The print job operation instruction as mentioned above may be performed in the print server apparatus 8.

In the above mentioned network printer 3 or print server apparatus 8, the rough image to be produced may be changed on the basis of a paper size specified by each print job.

The varied embodiment may include, for example, a variation that a contour of the rough image is changed on the basis of a paper size, or a variation that a size itself of the rough image is changed on the basis of the paper size.

Accordingly, the paper size outputted by each print job can be intuitively understood to there by make the identification further easy.

II. Second Embodiment

Next, a print managing system 200 of a second embodiment of the present invention is explained. Compared with the print managing system 100 of the first embodiment, a different part of the print managing system 200 of the second embodiment is that print data and a rough image data are encrypted in order to keep them secret. In addition, In FIGS. 7 to 9, the same constructional elements as those in FIGS. 1 to 3 carry the same reference numbers, and explanations thereof are omitted.

Figure 7:
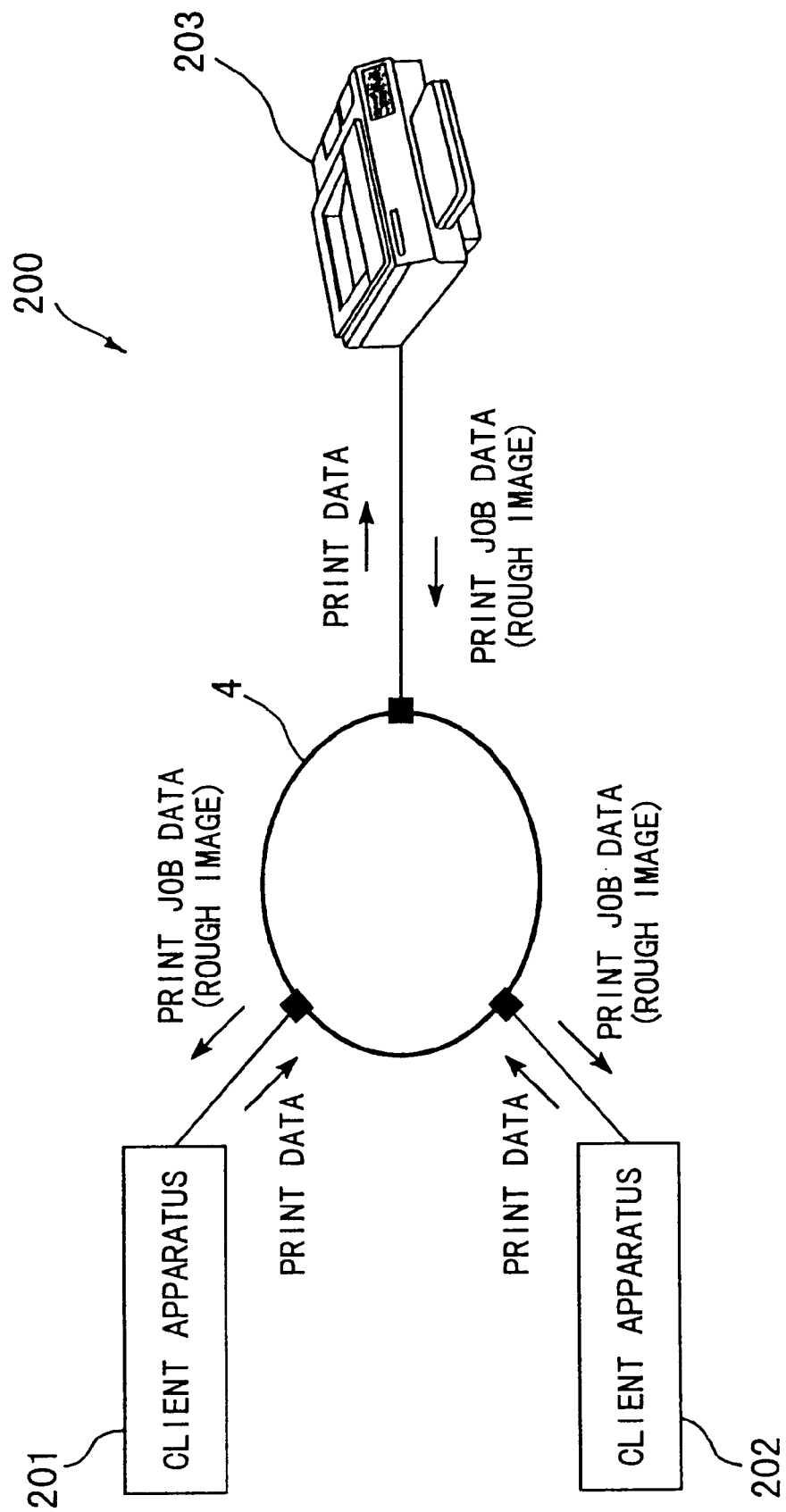
FIG. 7 is a diagram showing a print managing system of a second embodiment of the present invention.

As shown in FIG. 7, the print managing system 200 of this embodiment is provided with: client apparatuses 201 and 202, such as a personal computer and the like, for generating print data; a network printer 203 which is a printing apparatus corresponding to a network; and a network 4 for connecting them.

Figure 8A:
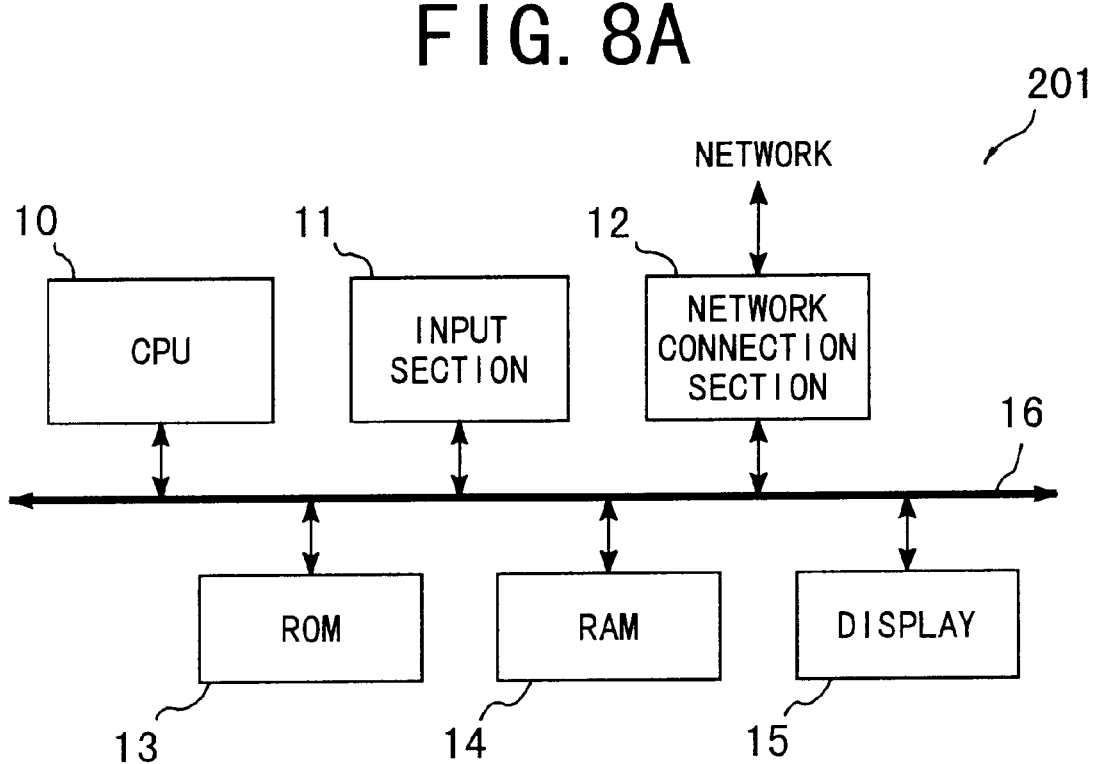
FIG. 8A is a block diagram showing a computer of the second embodiment of the present invention.

Each of the client apparatuses 201 and 202 has a configuration as shown in FIG. 8A in order to generate such print data and send and receive various data. The configuration of each client apparatus 201, 202 is the same as that of the client apparatus 1, 2 of the first embodiment. Namely, each of the client apparatuses 201 and 202 is provided with a CPU 10, an input section 11, a network connecting section 12, a ROM 13, a RAM 14, a display 15 and a bus 16.

Further, a print management control program of the second embodiment as described below in the CPU 10 is installed in the RAM 14, and the CPU 10 performs an operating process and the like, based on a printer driver program and an application program stored in the RAM 14.

Figure 8B:
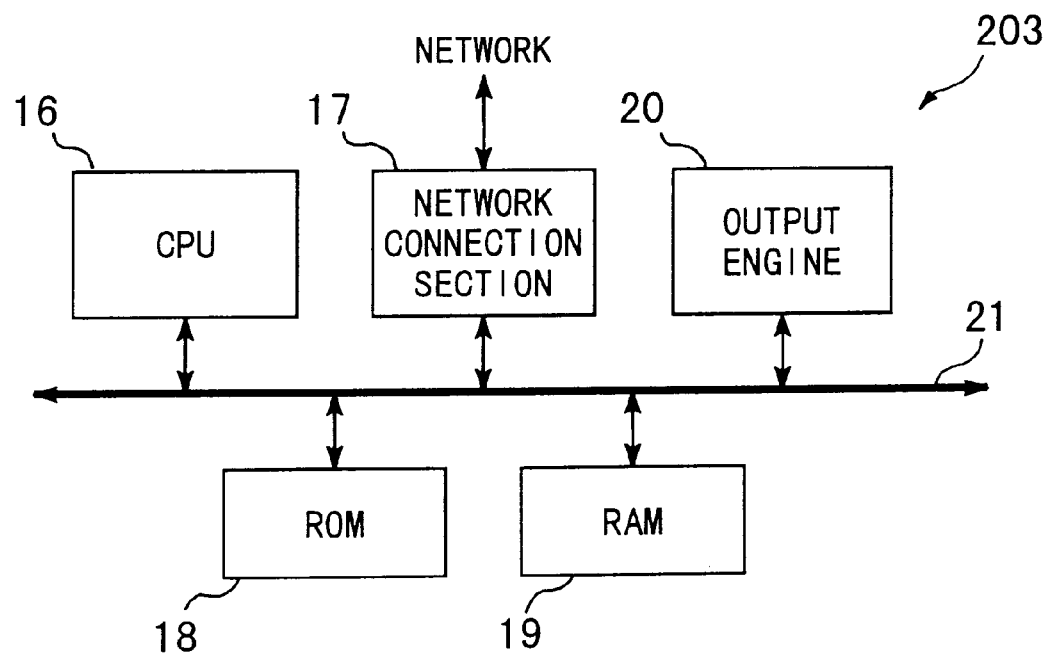
FIG. 8B is a block diagram showing a network printer of the second embodiment of the present invention.

Like the printer 3 of the first embodiment, the printer 203 is composed of a CPU 16, a network connecting section 17, a ROM 18, a RAM 19, an output engine 20 and a bus 21, as shown in FIG. 8B.

Further, a control program to realize functions described later is stored in the ROM 18, and the CPU 16 performs an operating process to realize the functions described later, based on the control program stored in the ROM 18.

Figure 9:
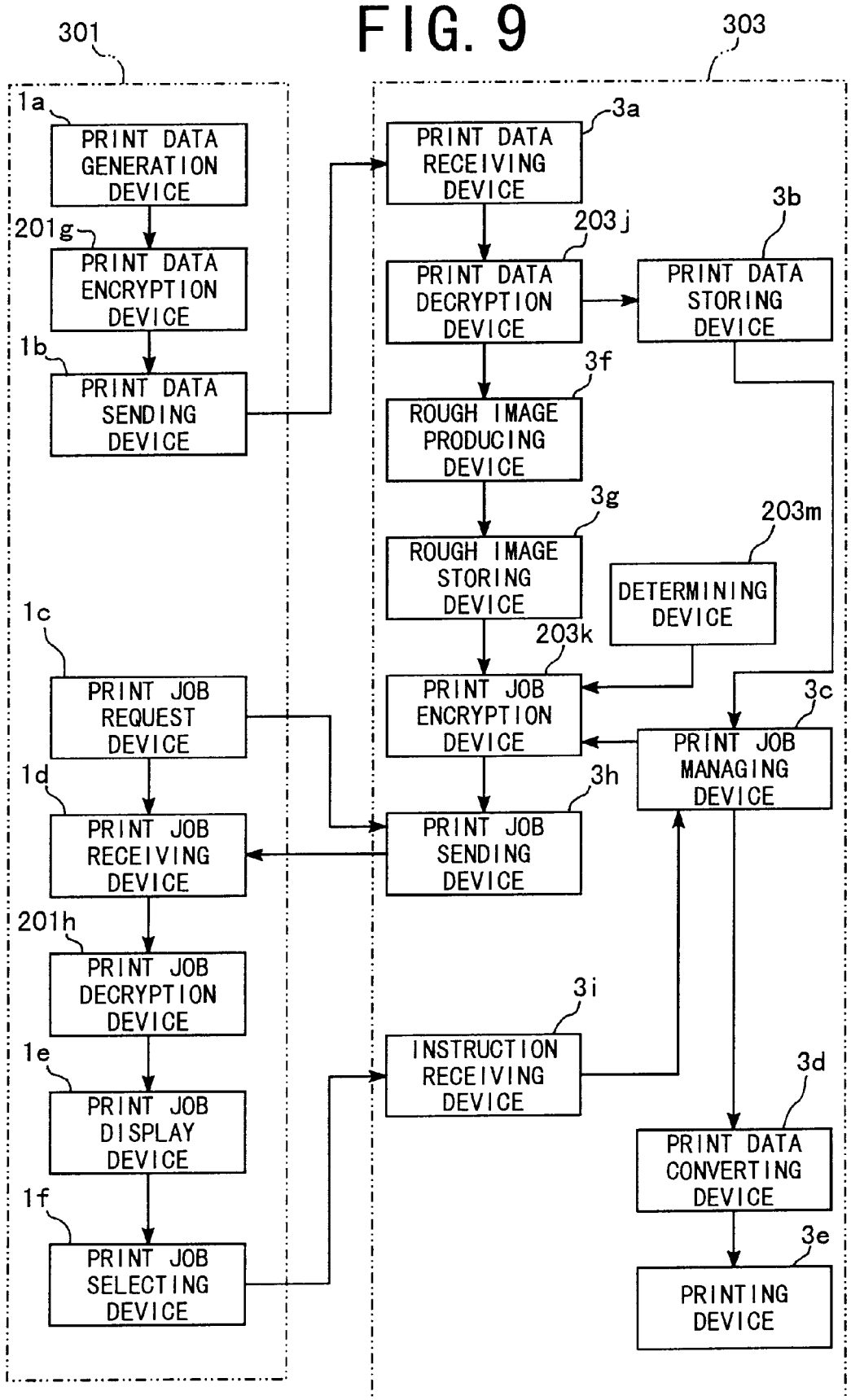
FIG. 9 is a block diagram showing a configuration of the print managing system of the second embodiment of the present invention in view of its functions.

Next, FIG. 9 is a block diagram to explain the client apparatus 201 and the printer 203 in view of the function. Incidentally, also in FIG. 9, the configuration of the client apparatus 202 is similar to that of the client apparatus 201. Thus, the explanation is omitted.

Like the client apparatus 1 of the first embodiment, the client apparatus 201 functions as a print data generation device 1*a*, a print data sending device 1*b*, a print job request device 1*c*, a print job receiving device 1*d*, a print job display device 1*e* and a print job selecting device 1*f*. In the second embodiment, the client apparatus 201 further functions as a print data encryption device 201*g* and a print job decryption device 201*h*. Namely, these devices are realized in the CPU 10 by the execution of the installed application program and printer driver program and by cooperation between the CPU 10 and other components of the client apparatus 1, i.e., the input section 11, the network connecting section 12, the ROM 13, the RAM 14, the display 15 and the bus 16.

The print data encryption device 201*g* is a device for encrypting the print data, as necessary, and performs the encryption by using a public key encryption system, which is widely put into practical use, such as an RSA (Rivest, Shamir and Adleman) system.

The public key encryption system passes a key for an encryption referred to as a public key from a receiving side to a sending side. The receiving side encrypts transmission information by using the public key. Then, the receiving side, when receiving this encrypted information, decrypts the received information by using a secret key corresponding to the public key.

In this system, if only the secret key on the receiving side is kept secret, the secularity of the encryption can be ensured even if the public key is published. Moreover, the utilization of the public key encryption system enables the public key to be automatically obtained without managing encryption information in advance. This results in an easy management.

Figure 10:
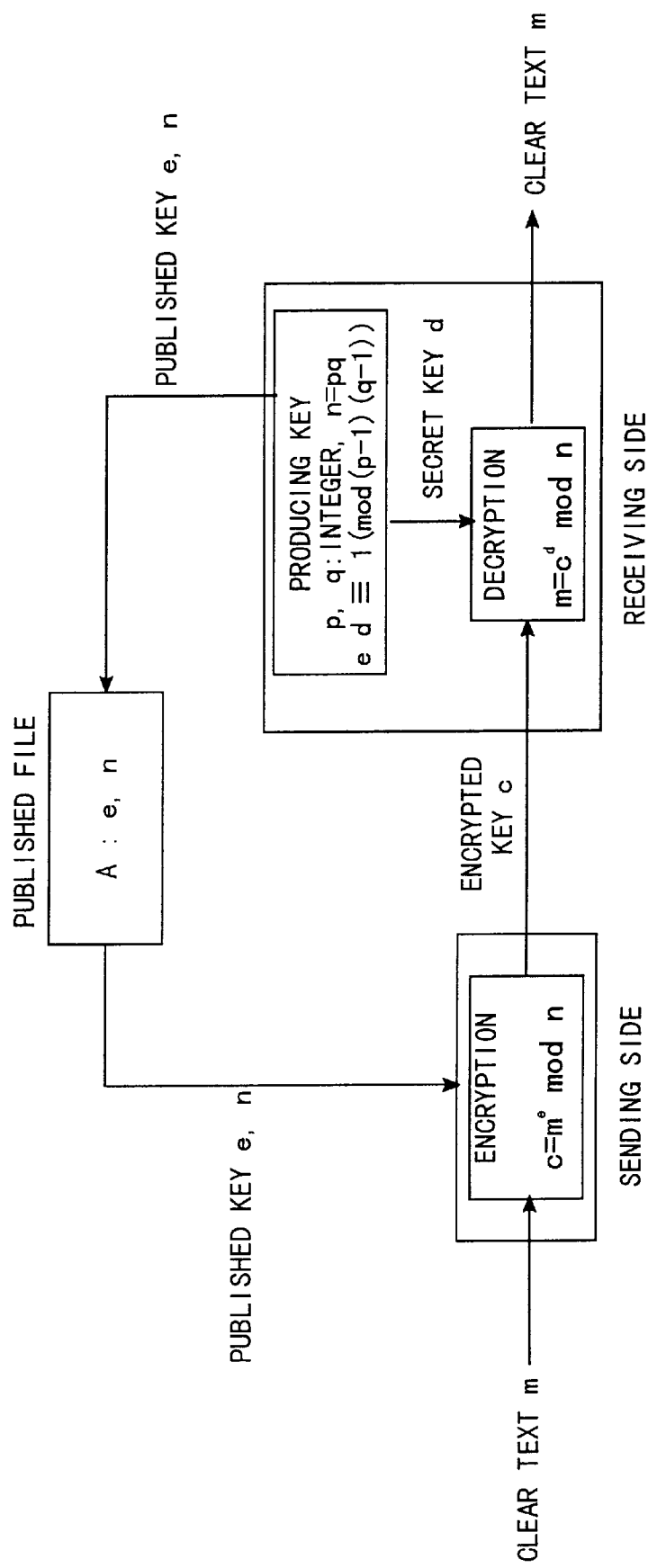
FIG. 10 is a block diagram showing a public key encryption system.

In an example shown in FIG. 10, when assuming a clear text to sent in secret to be m (an integer as defined by $0 \leq m \leq n-1$), the sending side uses public keys e, n passed by the receiving side in order to encrypt the clear text m. Concretely, a remainder c ($c = m^e \mod n$) of raising m to the e power and then dividing the raised value by n is sent to the receiving side as an encryption text. The receiving side, when receiving it, uses a secret key d generated from the public keys e, n and accordingly calculates a remainder ($m = c^d \mod n$) of raising c to the d power and then dividing the raised value by n to thereby obtain the clear text m. In this way, since the public keys e, n are published, any one can send a message to a receiving side. On the other hand, only a receiving side, who knows the secret key d, can decrypt the encryption text.

In this embodiment, the public key is sent to the client apparatuses 201 and 202 at a predetermined timing from the printer 203. Each of the client apparatuses 201 and 202 uses this public key to thereby encrypt the print data by the print data encryption device 201*g*. The public key is not limited to the embodiment of sending from the printer 203. For example, it may be published in a telephone directory, etc., for example, so that the users of the client apparatuses 201 and 202 may input the public key.

This encryption enables the user of the client apparatus to execute only for the print data that is not desired to be viewed by other people. A secret setting information input device (not shown) enables the selection whether or not this encryption is executed. For example, an instruction picture (select button), such as a switch box and the like, is displayed on the display 15. Accordingly, the user performs the selection by using a mouse and the like.

The print job decryption device 201*h* is a device for decrypting the rough image data sent from the printer 203. The decryption is performed when the rough image data was encrypted by the above mentioned public key encryption system. However, the public key used in this decryption is that sent from the client apparatus 201 to the printer 203. The print job decryption device 201*h* performs the decryption in accordance with the secret key corresponding to this public key. Hence, even if the rough image data encrypted by the client apparatus 202 is received by the client apparatus 201 as the print job data, the rough image data cannot be decrypted in the client apparatus 201, because the client apparatus 201 does not know the secret key of the client apparatus 202, Therefore, the rough image of the client apparatus 202 is not displayed in the client apparatus 201.

Like the network printer 3 of the first embodiment, the network printer 203 functions as a print data receiving device 3*a*, a print data storing device 3*b*, a print job managing device 3*c*, a print data converting device 3*d*, a printing device 3*e*, a rough image producing device 3*f*, a rough image storing device 3*g*, a print job sending device 3*h* and an instruction receiving device 3*i*. In the second embodiment, the network printer 203 further functions as a print data decryption device 203*j*, a print job encryption device 203*k*, a determining device 203*m*. Namely, these devices are realized in the CPU 16 by the execution of the control program stored in the ROM 18 and by cooperation between the CPU 16 and other components of the network printer 3, i.e., the network connecting section 17, the ROM 18, the RAM 19, the output engine 20 and the bus 21.

The print data decryption device 203*i* is a device for decrypting the print data encrypted by the print data encryption device 201g of the client apparatus 201, and then performs the decryption by the secret key corresponding to the public key sent to the client apparatuses 201, 202 from the printer 203.

The print job encryption device 203*k* is a device for using the public key sent by the client apparatuses 201, 202 to thereby encrypt the rough image data. Whether or not the encrypt is executed depends on the instruction of the determining device 203*m*.

The determining device 203*m* is a device for determining to encrypt the rough image data for the print data when the print data received by the print data receiving device 3*a* was encrypted. It determines not to encrypt the rough image data when the print data was not encrypted.

As mentioned above, the print managing system 200 of the second embodiment perform the encryption and decryption with respect to the print data and the rough image data by using the public key encryption system.

Namely, the print data sent by the print data sending device 1*c* can be encrypted by the print data encryption device 201*g* as necessary, and this encryption is performed by using the public key sent from the printer 203. Thus, it is decrypted only by the print data decryption device 203*j* of the printer having the secret key corresponding to this public key. Therefore, the encrypted print data is never decrypted by the apparatuses other than the printer 203.

If the print data is encrypted as mentioned above, the determining device 203*m* determines that the encryption is necessary. Accordingly, the rough image data is encrypted by the print job encryption device 203*k*. It is performed by using the public key sent from each client apparatus for each client apparatus.

When it is received by the client apparatus as the encrypted data or the print job data, it is decrypted by the print job decryption device 201*b*. If the rough image data is produced in accordance with the print data sent by the client apparatus, since it is encrypted by the public key sent by the client apparatus, it is decrypted by the print job decryption device 201*h* of the client apparatus having the secret key corresponding to the public key. Then, the rough image is displayed on the display 15. However, in a case of the rough image data produced in accordance with the print data sent by other client apparatus, it is decrypted by the public key sent by the other client apparatus. Hence, it cannot be decrypted in the client apparatus, and thereby the rough image of the other client apparatus is not displayed.

In this way, as for the print data that is not desired to be viewed by other people, the rough image is not displayed. Therefore, the security can be ensured.

Figure 11:
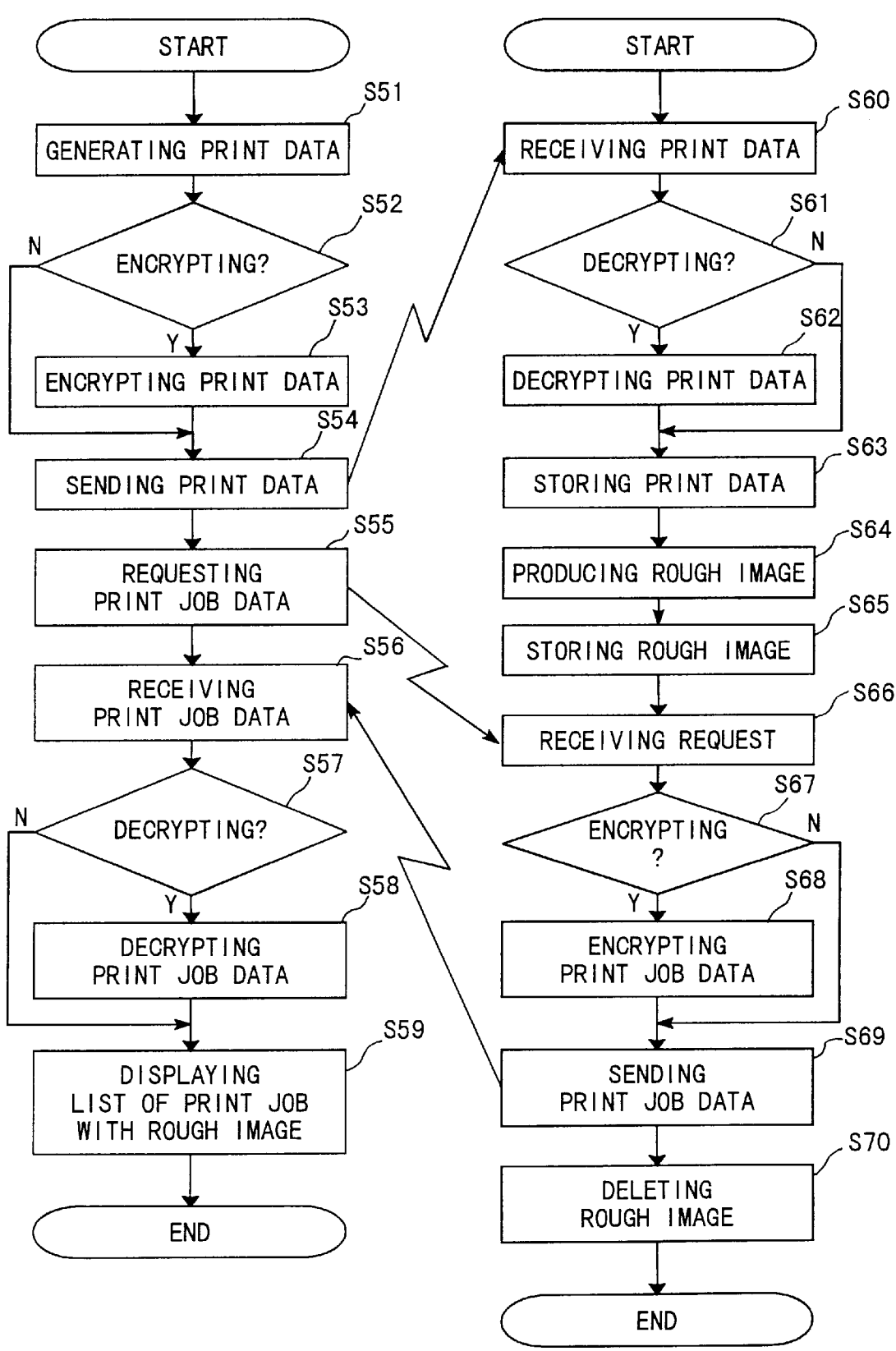
FIG. 11 is a flowchart showing a print managing process in the second embodiment of the present invention.

Next, the operations of the print managing system 200 in the second embodiment are explained with reference to FIG. 11.

At first, when a print command is inputted in the client apparatus 201 or 202, print data in a form of the page description language is generated by the print data generating device 1a (Step S51). Next, it is determined whether or not the encryption of this print data is necessary (Step S52). If the encryption is instructed by an operation of a user (Step S52; YES), the print data is encrypted by the print data encryption device 201g (Step S53). However, if the encryption is not instructed (Step S52; NO), the encryption is not performed.

Next, the print data is sent to the printer 203 by the print data sending device 1c (Step S54), and received by the print data receiving device 3a of the printer 203 (Step S60). Now, it is determined whether or not the decryption of the print data is necessary, i.e., the print data is encrypted (Step S61). If the print data is encrypted (Step S61; YES), it is decrypted by the print data decryption device 203j (Step S62). If the print data is not encrypted (Step S61; NO), the decryption is not necessary and the print data is stored in a spool area by the print data storing device 3b (Step S63). Then, rough image data based on the received print data is produced by the rough image producing device 3g (Step S64). The rough image data is stored by the rough image storing device 3h while correlated to the based print data (Step S65). Then, the print data is managed by the print job managing device 3d for each print job, and sequentially printed.

On the other hand, when a request command for print job information is input ted in the client apparatus 201 or 202, the print job request device 1d requires the printer 203 to send the print job data (Step S55). When this requirement is received by the print a job sending device 3k (Step S66), the print job sending device 3k receives the print job management information with regard to the print data stored in the spool area from the print job managing device 3d, and further receives the stored rough image data, which is correlated to each print data, from the rough image storing device 3h. However, at this time, it is determined by the determining device 203m whether or not it is necessary that the print job information including the rough image data is encrypted (Step S67). If the based print data is encrypted, it is determined that the encryption is necessary (Step S67; YES). Then, the print job information including the rough image data is encrypted by the print job encryption device 203k. If the based print data is not encrypted, it is determined that the encryption is not necessary (Step S67; NO).

Then, the print job sending device 3k sends the print job management information and the rough image data to the client apparatus 201 or 202 as the print job data (Step S69).

This print job data is received by the print job receiving device 1e of the client apparatus 201 or 202 (Step S56). Then, it is determined whether or not the rough image data is encrypted and the decryption is necessary (Step S57). As a result, if the decryption is necessary (Step S57; YES), the print job data is decrypted by the print job decryption device 201h (Step S58). In addition, if the print job data base on the print data of the other client apparatus is received, the decryption fails.

The print job data which has been decrypted or maintained in the received state is displayed by the print job display device 1g (Step 59), for example, on the display 15 as shown in FIG. 5.

Figure 12:
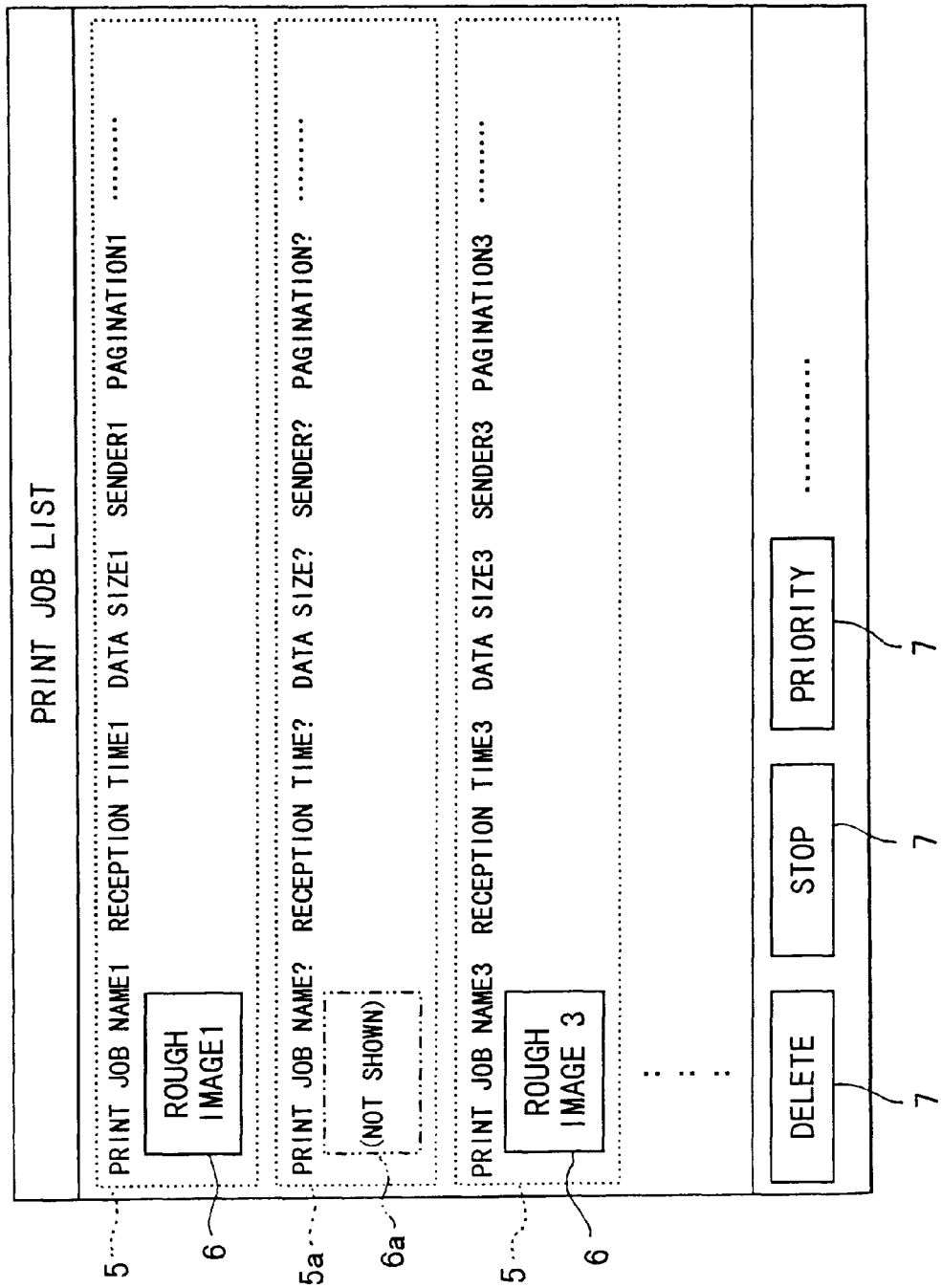
FIG. 12 is a diagram showing a list of print jobs displayed on a display of the computer of the second embodiment of the present invention.

However, since the encrypted print job information of the other client apparatus cannot be decrypted, it is not displayed, as shown in FIG. 12. Namely, in FIG. 12, contents or values of the print job name, the print reception time, the data size, the owner, the total page and the like are not displayed in the display block 5a, and a rough image is not displayed in a display area 6a. Hence, it is never known by the other people.

On the other hand, the printing process is consecutively performed parallel to the process of sending the print job data. The rough image data corresponding to the print data of the print Job whose printing operation is finished is deleted by the print job managing device 3d (Step S70).

As mentioned above, according to the second embodiment, the rough image of the print data is produced for each print job and sent to the client apparatus, which displays the rough image in a list display for the print job. Thus, it is possible to easily identify and select the content of each print job.

Further, the print data which must be kept secret cannot be viewed by client apparatuses other than a predetermined client apparatus. Thus, the security can be ensured. Moreover, when encrypting the rough image data, the information for the print job itself, such as a size of the print data, an output time and the like, can be encrypted to further protect the escape of the information.

Next, a variation example of this embodiment is explained. As for the methods for the encryption and the decryption, this embodiment is constructed to use the public key encryption system. However, a secret key encryption system, such as a DES (data encryption standard) method and the like, may be used instead of the public key encryption system. In a case of using the secret key encryption system, one secret key is used when performing the processes for the encryption and the decryption. It is possible to store the secret key in advance in the network printer and the client apparatus, in which the information is kept secret, to thereby maintain the information secret for the other client apparatuses.

Moreover, an encryption system may be used which is the combination of the public key encryption system and the secret key encryption system. This automatically generates a secret key used in the secret key encryption system with a tentative utilization as a purpose. The automatically generated secret key is sent and received between the network printing apparatus and the client apparatus by using the public key encryption system. The respective processes for the encryption and the decryption of the print data and the encryption and the decryption of the print job data are performed by using the secret key of the secret key encryption system. The secret key encryption system can perform the encryption and the decryption faster than the public key encryption system. Hence, it is possible to have both the convenience in the public key encryption system and the fastness in the secret key encryption system.

III. Third Embodiment

Next, a third embodiment of the present invention is explained.

This embodiment is intended to selectively send data to thereby ensure the security, and not intended to encrypt the print data which is desirable to be kept secret.

At first, secret setting information which is the information whether or not the print data generated by the print data generating device 1a is public is set by, for example, confidential flags and the like stored in the RAM 14. Next, the secret setting information is sent by the print data sending device 1c, together with the print data.

On the other hand, in the network printer 3, if the print data and the secret setting information are received by the print data receiving device 3a and then the client apparatus requires to send the print job information, the secret setting information corresponding to the print data is determined by the CPU 16 whether or not the print job information corresponding to the print data can be sent. As a result, if the data can be published, the print job data is sent by the print job sending device 3k. However, if the data should be kept secret, the print job data is not sent.

Therefore, since the print job information to be kept secret is not displayed in the other client apparatuses, the security can be ensured.

According to the third embodiment, since the encryption and the decryption are not necessary, the print job can be quickly displayed while ensuring the security.

Incidentally, a password in addition to the confidential flags may be used as the secret setting information.

When the confidential flags and the password are set, it may be constructed so as not to produce the rough image data itself. If doing so, the process can be simplified.

Furthermore, when the rough image data is not sent or produced, if it is constructed so as not to send or generate the information of the print job itself, such as a sending person, a size of print data, an output time and the like, this can further protect the escape of the information.

The print management control program which realizes the print managing system of the present invention as mentioned above can be recorded on a recording medium or a program storage device, such as a CD-ROM, a floppy disk or the like, which can be read by each of the client apparatus and the printer. Accordingly, the print managing system of the present invention is realized by using the CD-ROM or the like to then install and execute the print management control program in each of the client apparatus and the printer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A print managing system comprising:
   a plurality of client apparatuses for generating print data and sending the generated print data to a printing apparatus; and
   the printing apparatus connected with each of the client apparatuses though a network for receiving the print data from each of the client apparatuses, managing the received print data as a print job, which is a unit corresponding to one print data received from each of the client apparatuses, and printing the received print data for each print job, each of the client apparatuses comprising:
   a print data generating device for generating the print data;
   a print data sending device for sending the generated print data to the printing apparatus;
   a print job information request device for sending a request signal to request print job information to the printing apparatus;
   a print job information receiving device for receiving the print job information from the printing apparatus; and
   a print job information display device having a display area for displaying the received print job information as a list, in which management information of the print job and a rough image correlated with the print data corresponding to the print job included in the received print job information are arranged both the management information and the corresponding rough image being arranged in the display area at a time in a one-to-one corresponding manner,
   the printing apparatus comprising:
   a print data receiving device for receiving the print data from each of the client apparatuses;
   a print data storing device for storing the received print data;
   a rough image producing device for producing a rough image, which roughly shows an image corresponding to the stored print data, on the basis of the stored print data;
   a rough image storing device for storing the produced rough image, and correlating the produced rough image with the stored print data on which the produced rough image is based;
   a print job managing device for managing the stored print data as the print job, and generating the management information to identify the print job;
   a request receiving device for receiving the request signal from each of the client apparatuses;
   a print job information sending device for sending the print job information including the management information and the rough image correlated with the print data corresponding to the print job to each of the client apparatuses in response to a reception of the request signal;
   a converting device for converting the print data stored by the print data storing device into output image data which corresponds to an image or text that is ultimately printed out from the printing apparatus;
   an output image data storing device for storing the output image data; and
   a printing device for printing out an output corresponding to the output image data,
   wherein the management information and the rough image included in the print job sent by the print job information sending device are correlated with each other and each correspond to the common print job, and
   wherein a size of data of the rough image is smaller than a size of the output image data.

2. A method of managing the print job in a print managing system comprising:
   a plurality of client apparatuses for generating print data and sending the generated print data to a printing apparatus; and the printing apparatus connected with each of the client apparatuses though a network for receiving the print data from each of the client apparatuses, managing the received print data as a print job, which is an unit corresponding to one print data received from each of the client apparatuses, and printing the received print data for each print job, the method comprising the processes of:

generating the print data in each of the client apparatuses;

sending the generated print data from each of the client apparatuses to the printing apparatus;

receiving the print data from each of the client apparatuses in the printing apparatus;

storing the received print data in the printing apparatus;

producing a rough image, which roughly shows an image corresponding to the stored print data, on the basis of the stored print data in the printing apparatus;

storing the produced rough image in a rough image storing device disposed in the printing apparatus, and correlating the produced rough image with the stored print data, on which the produced rough image is based, in the printing apparatus;

managing the stored print data as the print job in the printing apparatus and generating the management information to identify the print job;

sending a request signal to request print job information from each of the client apparatuses to the printing apparatus;

receiving the request signal from each of the client apparatuses, in the printing apparatus;

sending the print job information including management information and the rough image correlated with the print data corresponding to the print job from the printing apparatus to each of the client apparatuses, in response to a reception of the request signal;

receiving the print job information from the printing apparatus, in each of the client apparatuses;

displaying the received print job information in a display area of a display device disposed in each of the client apparatuses as a list, in which the management information of the print job and the rough image correlated with the print data corresponding to the print job included in the received print job information are arranged, both the management information and the corresponding rough image being arranged; in the display area at a time in a one-to-one corresponding manner;

converting the print data stored in the printing apparatus into output image data which corresponds to an image or text that is ultimately printed out from the printing apparatus;

storing the output image data into an output image data storing device disposed in the printing apparatus; and printing out an output image corresponding to the output image data from the printing apparatus, wherein the management information and the rough image included in the print job information sent from the printing apparatus to each of the client apparatuses are correlated with each other and each correspond to the common print job, and wherein a size of data of the rough image is smaller then a size of the output image data.

3. A method of managing the print job in a print managing system comprising:

a plurality of client apparatuses for generating print data and sending the generated print data to a printing apparatus; and the printing apparatus connected with each of the client apparatuses though a network for receiving the print data from each of the client apparatuses, managing the received print data as a print job, which is a unit corresponding to one print data received from each of the client apparatuses, and printing the received print data for each print job, the method comprising the processes of:

generating the print data in each of the client apparatuses;

encrypting the generated print data in each of the client apparatuses;

sending the encrypted print data from each of the client apparatuses to the printing apparatus;

receiving the encrypted print data from each of the client apparatuses, in the printing apparatus;

decrypting the received print data in the printing apparatus;

storing the decrypted print data in the printing apparatus;

producing a rough image, which roughly shows an image corresponding to the stored print data, on the basis of the stored print data in the printing apparatus;

storing the produced rough image in a rough image storing device disposed in the printing apparatus and correlating the produced rough image with the stored print data, on which the produced rough image is based, in the printing apparatus;

managing the stored print data as the print job in the printing apparatus and generating the management information to identify the print job;

sending a request signal to request print job information from each of the client apparatuses to the printing apparatus;

receiving the request signal from each of the client apparatuses, in the printing apparatus;

encrypting the print job information including management information and the stored rough image correlated with the print data corresponding to the print job, in the printing apparatus;

sending the encrypted print job information from the printing apparatus to each of the client apparatuses in response to a reception of the request signal;

receiving an encrypted print job information from the printing apparatus, in each of the client apparatuses;

decrypting the received print job information in each of the client apparatuses;

displaying the decrypted print job information in a display area of a display device disposed in each of the client apparatuses as a list, in which the management information of the print job and the rough image correlated with the print data corresponding to the print job included in the decrypted print job information are arranged both the management information and the corresponding rough image being arranged in the display area at a time in a one-to-one corresponding manner;

converting the decrypted print data stored in the printing apparatus into output image data which corresponds to an image or text that is ultimately printed out from the printing apparatus;

storing the output image data into an output image data storing device disposed on the printing apparatus; and printing out an output image corresponding to the output image data stored in the output image data storing device, wherein the management information and the rough image included in the encrypted print job information sent from the printing apparatus to each of the client apparatuses are correlated with each other and each correspond to the common print job, wherein a size of data of the rout image is smaller than a size of the output image data, and a capacity of the rough image storing device is smaller than a capacity of the output storing device, and wherein the display area is divided into a plurality of display sections, the print job information corresponding to a plurality of print jobs are arranged in the display sections in a way that the print job information corresponding to each of the print jobs is arranged in the different display section and, in each of the display sections, both the management information and the corresponding rough image are arranged at a time in a one-to-one corresponding manner.

4. A program storage device readable by a first computer included in each of a plurality of client apparatuses and a second computer included in a printing apparatus in a print managing system comprising:

the plurality of client apparatuses for generating print data and sending the generated print data to the printing apparatus; and the printing apparatus connected with each of the client apparatuses though a network for receiving the print data from each of the client apparatuses, managing the received print data as a print job, which is a unit corresponding to one print data received from each of the client apparatuses, and printing the received print data for each print job, tangibly embodying a program of instructions executable by the first computer and the second computer to perform method processes for managing the print job, said method processes comprising:

generating the print data in each of the client apparatuses;

sending the generated print data from each of the client apparatuses to the printing apparatus;

receiving the print data from each of the client apparatuses, in the printing apparatus;

storing the received print data in the printing apparatus;

producing a rough image, which roughly shows an image corresponding to the stored print data, on the basis of the stored print data in the printing apparatus;

storing the produced rough image in a rough image storing device disposed in the printing apparatus and correlating the produced rough image with the stored print data, on which the produced rough image is based, in the printing apparatus;

managing the stored print data as the print job in the printing apparatus and generating the management information to identify the print job;

sending a request signal to request print job information from each of the client apparatuses to the printing apparatus;

receiving the request signal from each of the client apparatuses, in the printing apparatus;

sending the print job information including management information and the rough image correlated with the print data corresponding to the print job from the printing apparatus to each of the client apparatuses, in response to a reception of the request signal;

receiving the print job information from the printing apparatus, in each of the client apparatuses;

displaying the received print job information in a display area of a display device disposed in each of the client apparatuses as a list, in which the management information of the print job and the rough image correlated with the print data corresponding to the print job included in the received print job information are arranged both the management information and the corresponding rough image being arranged in the display area at a time in a one-to-one corresponding manner;

converting the print data stored in the printing apparatus into output image data which corresponds to an image or text that is ultimately printed out from the printing apparatus;

storing the output image data onto an output image data storing device disposed in the printing apparatus; and printing out an output image corresponding to the output image data from the printing apparatus, wherein the management information and the rough image included in the print job information sent from the printing apparatus to each of the client apparatuses are correlated with each other and each correspond to the common print job, and wherein a size of data of the rout image is smaller than a size of the output image data.

5. A program storage device readable by a first computer included in each of a plurality of client apparatuses and a second computer included in a printing apparatus in a print managing system comprising:

the plurality of client apparatuses for generating print data and sending the generated print data to the printing apparatus; and the printing apparatus connected with each of the client apparatuses though a network for receiving the print data from each of the client apparatuses, managing the received print data as a print job, which is a unit corresponding to one print data received from each of the client apparatuses, and printing the received print data for each print job, tangibly embodying a program of instructions executable by the first computer and the second computer to perform method processes for managing the print job, said method processes comprising:

generating the print data in each of the client apparatuses;

encrypting the generated print data in each of the client apparatuses;

sending the encrypted print data from each of the client apparatuses to the printing apparatus;

receiving the encrypted print data from each of the client apparatuses, in the printing apparatus;

decrypting the received print data in the printing apparatus;

storing the decrypted print data in the printing apparatus;

producing a rough image, which roughly shows an image corresponding to the stored print data, on the basis of the stored print data in the printing apparatus;

storing the produced rough image in a rough image storing device disposed in the printing apparatus, and correlating the produced rough image with the stored print data, on which the produced rough image is based, in the printing apparatus;

managing the stored print data as the print job in the printing apparatus, and generating the management information to identify the print job;

sending a request signal to request print job information from each of the client apparatuses to the printing apparatus;

receiving the request signal from each of the client apparatuses, in the printing apparatus;

encrypting the print job information including management information and the stored rough image correlated with the print data corresponding to the print job, in the printing apparatus;

sending the encrypted print job information from the printing apparatus to each of the client apparatuses in response to a reception of the request signal;

receiving an encrypted print job information from the printing apparatus, in each of the client apparatuses;

decrypting the received print job information in each of the client apparatuses;

displaying the decrypted print job information in a display area of a display device disposed in each of the client apparatuses, as a list, in which the management information of the print job and the rough image correlated with the print data corresponding to the print job included in the decrypted print job information are arranged both the management information and the corresponding rough image being arranged in the display area at a time in a one-to-one corresponding manner;

converting the decrypted print data stored in the printing apparatus into output image data which corresponds to an image or text that is ultimately printed out from the printing apparatus;

storing the output image data into an output image data storing device disposed in the printing apparatus; and printing out an output corresponding to the output image data stored in the output data storing device, wherein the management information and the rough image included in the encrypted print job information sent from the printing apparatus to each of the client apparatuses are correlated with each other and each correspond to the common print job, wherein a size of data of the rough image is smaller than a size of the output image data, and a capacity of the rough image storing device is smaller than a capacity of the output image data storing device, and wherein the display area is divided into a plurality of display sections, the print corresponding to a plurality of print jobs are arranged on the display sections in a way that the print job information corresponding to each of the print jobs is arranged in a different display section and, in each of the display sections, both the management information and the corresponding rough image are arranged at a time in a one-to-one corresponding manner.

6. A print managing system comprising a plurality of client apparatuses for generating print data and sending the generated print data to a printing apparatus, and the printing apparatus connected with each of the client apparatuses through a network for receiving the print data from each of the client apparatuses, managing the received print data as a print job, which is a unit corresponding to one print data received from each of the client apparatuses, and printing the received print data for each print job, each of the client apparatuses comprising:

a print data generating device for generating the print data;

a print data encryption device for encrypting the generated print data;

a print data sending device for sending the encrypted print data to the printing apparatus;

a print job information request device for sending a request signal to request print job information to the printing apparatus;

a print job information receiving device for receiving an encrypted print job information from the printing apparatus;

a print job information decryption device for decrypting the received print job information; and a print job information display device having a display area for displaying the decrypted print job information as a list, in which management information of the print job and a rough image correlated with the print data corresponding to the print job included in the received print job information are arranged, both the management information and the corresponding rough image being arranged in the display area at a time in a one-to-one corresponding manner, the printing apparatus comprising:

a print data receiving device for receiving the encrypted print data from each of the client apparatuses;

a print data decryption device for decrypting the received print data;

a print data storing device for storing the decrypted print data;

a rough image producing device for producing a rough image, which roughly shows an image corresponding to the stored print data, on the basis of the stored print data;

a rough image storing device for storing the produced rough image, and correlating the produced rough image with the stored print data on which the produced rough image is based;

a print job managing device for managing the stored print data as the print job, and generating the management information to identify the print job;

a request receiving device for receiving the request signal from each of the client apparatuses;

a print job information encryption device for encrypting the print job information including the management information and the rough image correlated with the print data corresponding to the print job;

a print job information sending device for sending the encrypted print job information to each of the client apparatuses in response to a reception of the request signal;

a converting device for converting the print data stored in the print data storage device into output image data which corresponds to an image or text that is ultimately printed out from the printing apparatus;

an output image data storing device for storing the output image data; and a printing device for printing out an output image corresponding to the output image data, wherein the management information and the rough image included in the encrypted print job information sent by the print job information sending device are correlated with each other and each correspond to the common print job, wherein a size of data of the rough image is smaller than a size of the output image data and a capacity of the rough storing device is smaller than a capacity of the output storing device, and wherein the display area is divided into a plurality of display sections, the print job information corresponding to a plurality of print jobs are arranged in the display sections in a way that the print job information corresponding to each of the print jobs is arranged in the different display section and, in each of the display sections, both the management information and the corresponding rough image are arranged at a time in a one-to-one corresponding manner, the rough image producing device changing a size of the produced rough image according to a size of printing paper to be used for printing the stored print data.

7. The print managing system comprising a plurality of client apparatuses for generating print data and sending the generated print data to a printing apparatus, and the printing apparatus connected with each of the client apparatuses through a network for receiving the print data from each of the client apparatuses, managing the received print data as a print job, which is a unit corresponding to one print data received from each of the client apparatuses, and printing the received print data for each print job, each of the client apparatuses comprising:

a print data generating device for generating the print data;

a print data encryption device for encrypting the generated print data;

a print data sending device for sending the encrypted print data to the printing apparatus;

a print job information request device for sending a request signal to request print job information to the printing apparatus;

a print job information receiving device for receiving an encrypted print job information from the printing apparatus;

a print job information decryption device for decrypting the received print job information; and a print job information display device having a display area for displaying the decrypted print job information as a list, in which management information of the print job and a rough image correlated with the print data corresponding to the print job included in the received print job information are arranged, both the management information and the corresponding rough image being arranged in the display area at a time in a one-to-one corresponding manner, the printing apparatus comprising:

a print data receiving device for receiving the encrypted print data from each of the client apparatuses;

a print data decryption device for decrypting the received print data;

a print data storing device for storing the decrypted print data;

a rough image producing device for producing a rough image, which roughly shows an image corresponding to the stored print data, on the basis of the stored print data;

a rough image storing device for storing the produced rough image, and correlating the produced rough image with the stored print data on which the produced rough image is based;

a print job managing device for managing the stored print data as the print job, and generating the management information to identify the print job;

a request receiving device for receiving the request signal from each of the client apparatuses;

a print job information encryption device for encrypting the print job information including the management information and the rough image correlated with the print data corresponding to the print job;

a print job information sending device for sending the encrypted print job information to each of the client apparatuses in response to a reception of the request signal;

a converting device for converting the print data stored in the print data storage device into output image data which corresponds to an image or text that is ultimately printed out from the printing apparatus;

an output image data storing device for storing the output image data; and a printing device for printing out an output image corresponding to the output image data, wherein the management information and the rough image included in the encrypted print job information sent by the print job information sending device are correlated with each other and each correspond to the common print job, wherein a size of data of the rough image is smaller than a size of the output image data and a capacity of the rough storing device is smaller than a capacity of the output storing device, and wherein the display area is divided into a plurality of display sections, the print job information corresponding to a plurality of print jobs are arranged in the display sections in a way that the print job information corresponding to each of the print jobs is arranged in the different display section and, in each of the display sections, both the management information and the corresponding rough image are arranged at a time in a one-to-one corresponding manner, the print data sending device sends secret setting information to instruct to make a secret of the print data to the printing apparatus, together with the print data, the print data receiving device receives the secret setting information together with the print data from each of the client apparatuses, and when the print data receiving device receives the secret setting information from one of the client apparatuses, the print job information sending device does not send the print job information to the other client apparatuses.

8. The printing managing system according to claim 1, wherein a capacity of the rough image storing device is smaller than a capacity of the output image data storing device.

9. The printing managing system according to claim 8, wherein the display area is divided into a plurality of display sections, the print job information corresponding to a plurality of print jobs are arranged in the display sections in a way that the print job information corresponding to each of the print jobs is arranged in a different display section and, in each of the display sections, both the management information and the corresponding rough image are arranged at a time in a one-to-one corresponding manner.

10. The printing managing system according to claim 1, wherein the display area is divided into a plurality of display sections, the print job information corresponding to a plurality of print jobs are arranged in the display sections in a way that the print job information corresponding to each of the print jobs is arranged in a different display section and, in each of the display sections, both the management information and the corresponding rough image are arranged at a time in a one-to-one corresponding manner.

11. The printing managing system according to claim 7, wherein, when the stored print data includes data corresponding to a plurality of pages, the rough image producing device produces a plurality of the rough images each corresponding to a respective one of the plurality of pages.

12. The printing managing system according to claim 11, wherein the plurality of rough images are displayed in the display section at a time.

13. The printing managing system according to claim 11, wherein the print job information request device sends page information to select one or more pages from the plurality of pages to the printing apparatus, together with the request signal, the request receiving device receives the page information from each of the client apparatuses, together with the request signal, and the print job information sending device sends the print job information including the management information and the rough images of only pages selected on the basis of the received page information.

14. The printing managing system according to claim 7, wherein the rough image producing device changes a shape of a line forming a contour of the produced rough image according to a size of printing paper to be used for printing the stored print data.

15. The printing managing system according to claim 7, wherein the rough image producing device changes a size of the produced rough image according to a size of printing paper to be used for printing the stored print data.

16. The method according to claim 2, wherein a capacity of the rough image storing device is smaller than a capacity of the output image data storing device.

17. The method according to claim 16, wherein the display area is divided into a plurality of display sections, the print job information corresponding to a plurality of print jobs are arranged in the display sections in a way that the print job information corresponding to each of the print jobs is arranged in a different display section and, in each of the display sections, both the management information and the corresponding rough image are arranged at a time in a one-to-one corresponding manner.

18. The method according to claim 2, wherein the display area is divided into a plurality of display sections, the print job information corresponding to a plurality of print jobs are arranged in the display sections in a way that the print job information corresponding to each of the print jobs is arranged in a different display section and, in each of the display sections, both the management information and the corresponding rough image are arranged at a time in a one-to-one corresponding manner.

19. The program storage device according to claim 4, wherein a capacity of the rough image storing device is smaller than a capacity of the output image data storing device.

20. The program storage device according to claim 19, wherein the display area is divided into a plurality of display sections, the print job information corresponding to a plurality of print jobs are arranged in the display sections in a way that the print job information corresponding to each of the print jobs is arranged in a different display section and, in each of the display sections, both the management information and the corresponding rough image are arranged at a time in a one-to-one corresponding manner.

21. The program storage device according to claim 4, wherein the display area is divided into a plurality of display sections, the print job information corresponding to a plurality of print jobs are arranged in the display sections in a way that the print job information corresponding to each of the print jobs is arranged in a different display section and, in each of the display sections, both the management information and the corresponding rough image are arranged at a time in a one-to-one corresponding manner.

* * * * *